United States Patent
Shin et al.

(10) Patent No.: US 10,992,705 B2
(45) Date of Patent: Apr. 27, 2021

(54) EXPLOITING SAFE MODE OF IN-VEHICLE NETWORKS TO MAKE THEM UNSAFE

(71) Applicant: THE REGENTS OF THE UNIVERSITY OF MICHIGAN, Ann Arbor, MI (US)

(72) Inventors: Kang G. Shin, Ann Arbor, MI (US); Kyong-Tak Cho, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 237 days.

(21) Appl. No.: 16/071,400

(22) PCT Filed: Jan. 20, 2017

(86) PCT No.: PCT/US2017/014276
§ 371 (c)(1),
(2) Date: Jul. 19, 2018

(87) PCT Pub. No.: WO2017/127639
PCT Pub. Date: Jul. 27, 2017

(65) Prior Publication Data
US 2020/0213351 A1 Jul. 2, 2020

Related U.S. Application Data

(60) Provisional application No. 62/280,939, filed on Jan. 20, 2016.

(51) Int. Cl.
*G06F 21/44* (2013.01)
*G06F 11/07* (2006.01)
(Continued)

(52) U.S. Cl.
CPC .... *H04L 63/1466* (2013.01); *H04L 12/40176* (2013.01); *H04L 63/1416* (2013.01); *H04L 2012/40273* (2013.01)

(58) Field of Classification Search
None
See application file for complete search history.

(56) References Cited

U.S. PATENT DOCUMENTS 6,764,428 B2 * 7/2004 Rudolph .............. B60R 16/027
477/99
7,729,827 B2 * 6/2010 Sakurai ............ B60W 50/0205
370/229
(Continued)

FOREIGN PATENT DOCUMENTS

WO WO-2015159486 A1 10/2015

OTHER PUBLICATIONS

Error Handling of in-Vehicle Networks Makes Them Vulnerable. Cho et al. ACM. (Year: 2016).*
(Continued)

*Primary Examiner* — Venkat Perungavoor
(74) *Attorney, Agent, or Firm* — Harness, Dickey & Pierce, P.L.C.

(57) ABSTRACT

An important new vulnerability was discovered and is applicable to several in-vehicle networks including Control Area Network (CAN), the de facto standard in-vehicle network protocol. Specifically, a bus-off attack exploits the safe mode of CAN to disconnect or shut down uncompromised (healthy) ECUs. This is an important attack that must be thwarted, since once the attacker compromises an ECU, it is easy to mount the attack on safety-critical ECUs while its prevention/detection is very difficult. Based on analysis and experimental results, a mechanism to detect and/or prevent a bus-off attack is proposed and evaluated.

16 Claims, 13 Drawing Sheets

(51) Int. Cl.
*H04L 29/06* (2006.01)
*H04L 12/40* (2006.01)
*G06F 11/26* (2006.01)

(56) References Cited

U.S. PATENT DOCUMENTS

| | | | | |
|---|---|---|---|---|
| 8,213,321 | B2* | 7/2012 | Butts | H04L 41/0659 |
| | | | | 370/242 |
| 9,390,624 | B2* | 7/2016 | Minemura | G08G 1/166 |
| 9,725,073 | B2* | 8/2017 | Haga | B60R 25/307 |
| 9,902,370 | B2* | 2/2018 | Haga | B60R 25/307 |
| 2003/0131657 | A1 | 7/2003 | Anderson et al. | |
| 2008/0186870 | A1* | 8/2008 | Butts | H04L 43/0847 |
| | | | | 370/252 |
| 2008/0273527 | A1* | 11/2008 | Short | H04L 12/40182 |
| | | | | 370/364 |
| 2009/0183033 | A1* | 7/2009 | Ando | H04L 43/0823 |
| | | | | 714/43 |
| 2010/0150176 | A1 | 6/2010 | Yakashiro | |
| 2011/0188371 | A1 | 8/2011 | Brunnberg et al. | |
| 2013/0282357 | A1* | 10/2013 | Rubin | G01C 21/26 |
| | | | | 703/22 |
| 2015/0220401 | A1* | 8/2015 | Jiang | G06F 11/1441 |
| | | | | 714/23 |
| 2015/0258999 | A1* | 9/2015 | Jiang | B60W 50/029 |
| | | | | 701/29.2 |
| 2016/0294855 | A1 | 10/2016 | Maeda et al. | |
| 2017/0013005 | A1* | 1/2017 | Galula | G07C 5/0841 |
| 2020/0145251 | A1* | 5/2020 | Hass | H04L 63/1408 |

OTHER PUBLICATIONS

A Bus off Case of CAN Error Passive Transmitter. Yang. (Year: 2009).*
Controller Area Network. Kvaser. (Year: 2013).*
A Pratical Wireless Attack on the Connected Car and Security Protocol for in-Vehicle CAN. Woo. IEEE. (Year: 2015).*
International Search Report Written Opinion of the International Searching Authority issued in PCT/US2017/014276, dated Apr. 26, 2017; ISA/KR.
P. Murvay et al "Source Identification Using Signal Characteristics in Controller Area Networks", IEEE (2014).
S. Woo et al "A Practical Wireless Attack on the Connected Car and Security Protocol for in-Vehicle CAN", IEEE (2014).

* cited by examiner

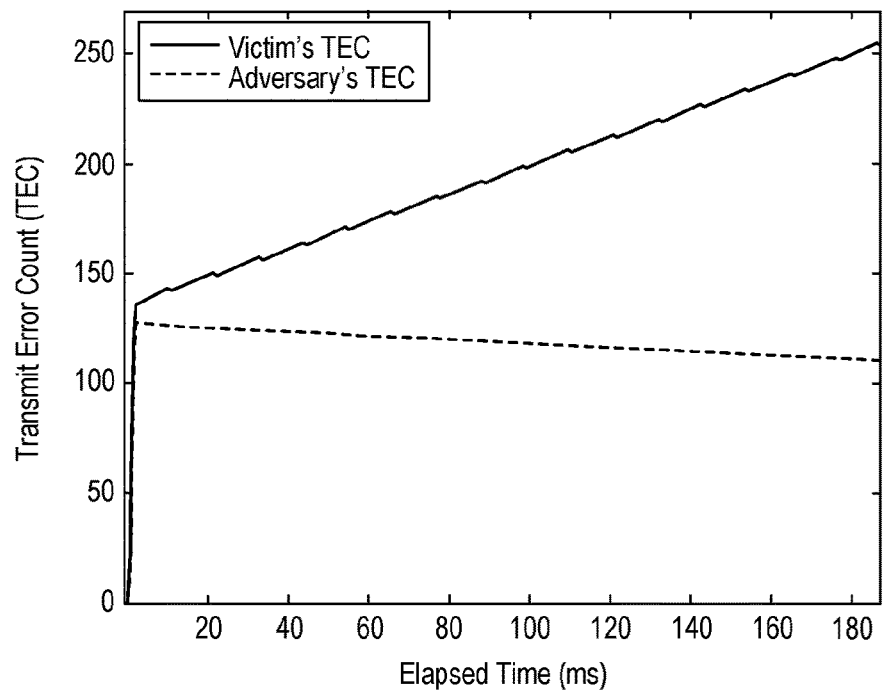
FIG. 13
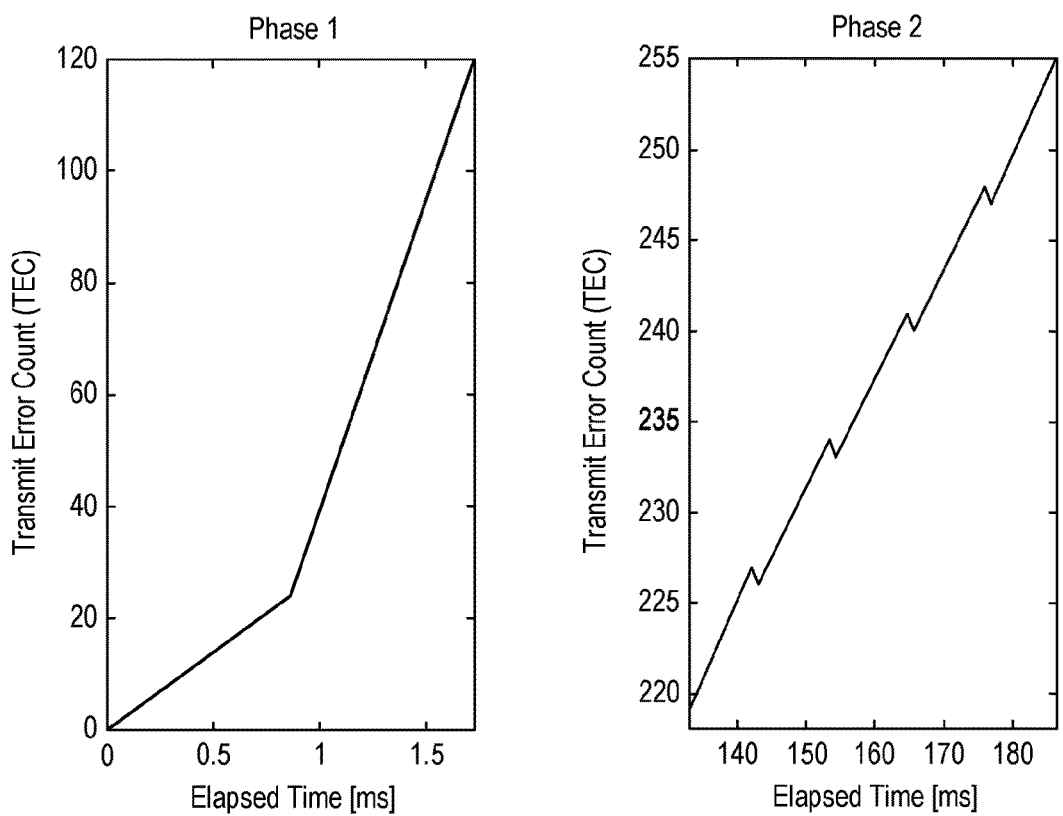
FIG. 14A  FIG. 14B

EXPLOITING SAFE MODE OF IN-VEHICLE NETWORKS TO MAKE THEM UNSAFE

CROSS-REFERENCE TO RELATED APPLICATIONS

This application is a 371 National Phase of PCT/US2017/014276 filed Jan. 20, 2017 and published in English as WO 127639 A1 on Jul. 27, 2017, which claims the benefit of U.S. Provisional Patent Application No. 62/280,939 filed on Jan. 20, 2016. The entire disclosures of the above applications are incorporated herein by reference.

FIELD

The present disclosure relates to techniques for countering an attack to shut down an electronic control unit of a controller area network (CAN).

BACKGROUND

Contemporary vehicles are usually equipped with 40-100 Electronic Control Units (ECUs), which are interconnected to exchange data for making maneuvering decisions. Such internally networked ECUs improve response time, safety, control precision, and fuel-efficiency for vehicles.

Internally wired ECUs are now being connected/exposed to external entities. Through vehicle-embedded Bluetooth, Wi-Fi, and cellular connections, drivers and passengers are provided with various types of infotainment and other applications/services. Typical examples of vehicle connection are GM's Onstar, Ford's Sync, and BMW's Assist. Moreover, Vehicle-to-Vehicle (V2V) and Vehicle-to-infrastructure (V2I) communications are used to introduce new functionalities such as remote diagnostic/prognosis, crash avoidance, and traffic management to enhance safety and mobility, and reduce environmental impact. Thanks to its substantial benefits to vehicles and drivers/passengers, external connectivity has been continuously gaining popularity and even starting to be considered as a regulation.

Vehicles with more external interfaces, however, prove to be a double-edged sword. While they provide a wide range of benefits, they also open up more remote surfaces/endpoints which an attacker can exploit and in the worst case, control the vehicle. Researchers have demonstrated how vulnerabilities in such endpoints are exploited to compromise an ECU, access the in-vehicle network, and take control of the vehicle. These vulnerabilities are inevitable due to the inherent nature of automotive manufacturing: in-vehicle components and software codes are developed and written by different organizations, and thus vulnerabilities emerge naturally at interface boundaries. The reality of vehicle cyber attacks has made automotive security one of the most critical issues that need to be resolved by industry and governments.

Researchers have experimentally evaluated various remote attack vectors (e.g., CD, PassThru, Bluetooth, Cellular) and have shown that they can indeed be exploited to remotely compromise ECUs and thus seize the control of a vehicle. Exploiting the compromised ECUs, researchers have also shown to be able to control vehicle maneuvers by packet injection in the in-vehicle network. Recently, researchers have been able to compromise and remotely stop a Jeep Cherokee running on a highway, which triggered a recall of 1.4 million vehicles. The researchers also succeeded in a remote attack via a vehicle's tire pressure monitoring system (TPMS). An ECU is shown to be reprogrammable by injecting forged diagnostic messages. However, in order to mount the demonstrated attacks, the attacker is required to reverse-engineer the messages on the in-vehicle network.

To detect or prevent vehicle cyber attacks, various types of security solutions for in-vehicle networks have been proposed (e.g., message authentication and intrusion detection). These provide a certain level of security, but there still remain critical, uncovered vulnerabilities specific to the automotive domain that existing Internet security solutions cannot handle.

A new attack model is described below and referred to herein as a bus-off attack. The attack model, ironically, exploits the safe mode (i.e., error handling) of in-vehicle networks. The attacker periodically injects its attack message to the in-vehicle network, deceives an uncompromised/healthy ECU into thinking it is defective, and eventually forces it to be to disconnected or shut down. It is important to detect/prevent the bus-off attack, as it can evade any state-of-the-art security mechanisms for in-vehicle networks, and it is thus neither preventable nor detectable. Moreover, since the attack relies solely on low-level safety features of in-vehicle networks, it is independent of actual implementation subtleties of different ECUs and their hardware/software. Also, the barrier for an attacker to mount this attack is low (e.g., no additional reverse-engineering of messages is required), while the severity of its consequences and the difficulties of its prevention are very high.

This section provides background information related to the present disclosure which is not necessarily prior art.

SUMMARY

This section provides a general summary of the disclosure, and is not a comprehensive disclosure of its full scope or all of its features.

A method is presented for countering an attack on an electronic control unit in a vehicle network. During transmission of data frames over a vehicle network, a transmitter error counter is incremented by a fixed increment when a transmission error is detected the electronic control unit. The method includes: detecting two or more consecutive transmission errors by the electronic control unit and implementing a preventive countermeasure in response to detecting two or more consecutive transmission errors. The preventive countermeasure may include resetting the electronic control unit itself or resetting the transmit error counter to a lower value, such as zero.

Upon detecting an error free transmission of the data frame by the electronic control unit, the transmit error counter is decremented by a fixed decrement.

Detecting two or more consecutive transmission errors further includes determining whether the transmission error was preceded immediately by another error in transmission of the data frame by the electronic control unit; incrementing a bus-off counter in response to a determination that the transmission was preceded immediately by another transmission error of the data frame, where the bus-off counter tracks consecutive transmission errors of the electronic control unit; and determining whether value of the bus-off counter exceeds a threshold. The transmit error counter is in turn reset in response to a determination that the value of the bus-off counter exceeds the threshold. In the event that the transmission was not preceded immediately by another transmission error of the data frame, the value of the bus-off counter is reset to zero.

Data frame may be transmitted in accordance with different communication protocols including but not limited to the controller area network (CAN) protocol or the FlexRay communication protocol.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 13 is a graph showing the transmit error count (TEC) of a victim and an adversary during an iterative bus-off attack;

FIGS. 14A and 14B are graphs showing magnified view of victim's TEC during Phase 1 and Phase 2, respectively;

Corresponding reference numerals indicate corresponding parts throughout the several views of the drawings.

DETAILED DESCRIPTION

Example embodiments will now be described more fully with reference to the accompanying drawings.

Among the various in-vehicle network protocols, this disclosure focuses on the vulnerability of the Control Area Network (CAN) protocol for concreteness, which is the de facto standard for in-vehicle networks. CAN was mandated by the U.S. Environmental Protection Agency (EPA) regulations to be outfitted on all 2008 and new model-year vehicles. As of 2014, at least 26.5 million of such mandated vehicles were sold in the U.S. alone, and of course, such a figure is expected to grow further. Considering the ubiquity of CAN in vehicles and its direct relationship with the driver/passenger's safety, it is imperative to address such a vulnerability. For completeness, the main features of CAN related to the proposed bus-off attack are reviewed below; reference may be made to the CAN specification for the features of the protocol that are not discussed here. While reference is made to CAN through this disclosure, it is readily understood that the countering methods described below may be applied to other in-vehicle network protocols. That is, the practicability of the bus-off attack is not limited to CAN but applicable to other in-vehicle network protocols, such as CAN-FD and TTCAN, which will be discussed further below.

CAN interconnects ECUs/nodes, through a multi-master, message broadcast bus. Each node broadcasts periodic (or occasionally sporadic) data frames on the CAN bus to provide retrieved sensor data. The transmitted data is received by one or more nodes on the bus and then utilized for maintaining data consistency, and more importantly, for vehicle control decisions.

Each CAN frame is basically a sequence of dominant (logical 0) and recessive (logical 1) bits, and belongs to one of four different types: data frame which is used for exchanging retrieved data; remote frame for requesting the transmission of a specified message; error frame used to indicate the detection of errors via error flags; and overload frame to inject delay between frames.

Figure 1:
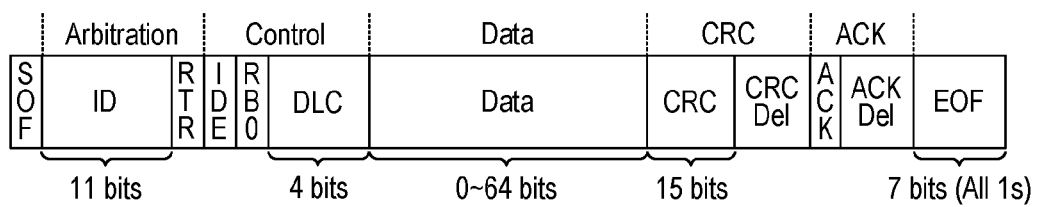
FIG. 1 is a diagram showing the format of a CAN data frame.

FIG. 1 shows the base format of a CAN data frame. A CAN data frame can carry up to 8 bytes of data, the length of which is specified in the 4-bit Data Length Code (DLC) field. Consecutive transmissions of CAN frames are separated by a 3-bit Interframe Space (IFS). Since CAN is a message-oriented transmission protocol, instead of containing the transmitter/receiver address, a CAN frame contains a unique identifier (ID), which represents its priority and physical meaning. For example, a frame containing front wheel speed values might have ID=0x01 and frame containing battery temperature values might have ID=0x20. Only one ECU is assigned to transmit a given ID at a time, and the ID values are defined to be distinct from each other by the manufacturer. The base frame format has an 11-bit ID, whereas an extended format has a 29-bit ID. Since the use of base format is much more prevalent than the extended format, this disclosure focuses on the base format. Note, however, that the attack model proposed in this disclosure is not dependent on the type of format.

Once the CAN bus is detected idle, a node with data to transmit, starts its frame transmission (Tx) by issuing a Start-of-Frame (SOF) indicator. SOF provides hard synchronization between ECUs so that bitwise transmission and reception are feasible. At that time, one or more other nodes may also have buffered data to transmit, and would thus concurrently access the bus. In such a case, the CAN protocol resolves the access contention via arbitration.

Figure 2:
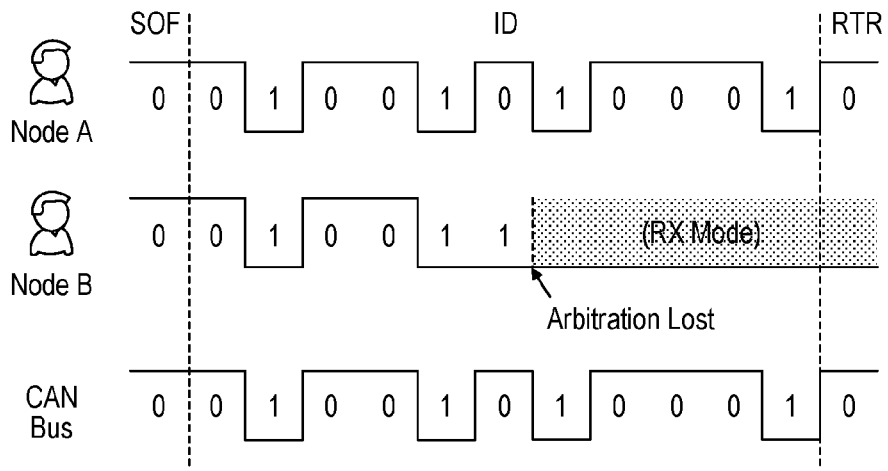
FIG. 2 is a diagram showing an example of CAN arbitration phase in which Node A wins arbitration and continues to transmit its CAN frame and Node B re-attempts to transmit its frame as soon as Node A has finished transmission.

During transmission, each node sends its frame one bit at a time and monitors the actual output on the CAN bus. In the arbitration phase, since frame IDs are unique and the CAN bus logically behaves as a wired-AND gate (e.g., 0 & 1=0), some contending nodes would monitor a dominant (0) bit even though it has transmitted a recessive (1) bit. In such a case, they lose arbitration, withdraw from bus contention, and switch to receiver mode. In the end, only one arbitration-winner node is allowed to continuously access the bus for data transmission. The process enables higher-priority frames (i.e., lower IDS values) to be transmitted before lower-priority ones. Once the arbitration winner has finished transmission of its frame ending with an End-of-Frame (EOF), after a 3-bit time of IFS, the bus again becomes free for access, i.e., idle. At that time, nodes that have buffered data or had previously lost arbitration, start another round of arbitration for bus access. FIG. 2 illustrates how arbitration and thus the collision resolution are achieved by the CAN protocol.

Error handling is built into the CAN protocol and is of great importance for its fault-tolerance. It aims to detect errors in CAN frames and enables ECUs to take appropriate actions, such as discarding a frame, retransmitting a frame, and raising error flags. The CAN protocol defines no less than five different ways of detecting errors.

Bit Error: Every transmitter compares its transmitted bit with the output bit on the CAN bus, and verifies whether the two are the same. If not, a bit error is considered to have occurred. An opposite polarity during arbitration is not considered as a bit error.

Stuff Error: After every five consecutive bits of the same polarity (e.g., 00000), an opposite polarity bit is stuffed. Bit-stuffing is to maintain soft synchronization between nodes so that proper bitwise transmission/reception is achieved. Violation of this bit-stuffing rule incurs a stuff error.

CRC Error: If the CRC calculation by the receiver is different from the received CRC, a CRC error is raised.

Form Error: When the fixed-form bit fields—e.g., CRC delimiter, ACK delimiter, EOF, IFS required to have recessive (1) values—contain at least one illegal bit, a form error has incurred.

ACK Error: When a node transmits a CAN frame, any node that has received it issues a dominant (0) bit in the ACK slot for an acknowledgment. If none replies, i.e., ACK slot remains recessive, an ACK error is raised.

For any detected errors, the perceived node transmits an error frame on the bus and increases one of the two error counters it maintains: Transmit Error Counter (TEC) and Receive Error Counter (REC). There are several rules governing the increase and decrease of these counters, but in essence, a node that detects an error during transmission increases TEC by 8; whereas, if perceived during reception, REC is increased by 1. Moreover, for any error-free transmission and reception, TEC and REC are decreased by 1, respectively. Throughout this disclosure, we will omit the details of all the rules except for the directly related ones.

Figure 3:
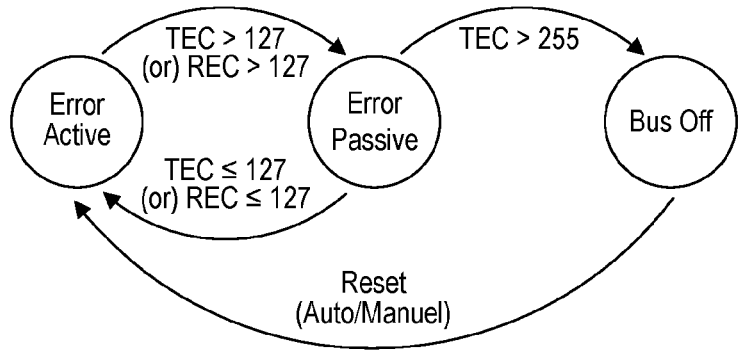
FIG. 3 is a state diagram of error handling in the CAN protocol.

In order to confine serious errors disrupting bus communications, each ECU's error mode is managed as shown in FIG. 3. All ECUs start in an error-active mode and switch between different modes depending on their TEC and REC values. When TEC or REC exceeds 127 due to consecutive errors, the node becomes error-passive, and only returns to its initial state when both go below 127. When TEC exceeds the limit of 255, the corresponding ECU—which must have triggered many transmit errors—enters the bus-off mode. Upon entering this mode, to protect the CAN bus from continuously being distracted, the error-causing (defective) ECU is forced to shut down and not participate in sending/receiving data on the CAN bus at all. It can be restored back to its original error-active mode, either automatically or manually. However, since bus-off is usually an indication of serious network errors and may not be fixed by mere automatic re-initialization of the CAN controller, a user-intervened recovery or even a controlled shut-down of the entire system is recommended.

When an error is detected, the perceived node indicates to others on the bus via an error flag/frame, which comes in two forms: active or passive error flag. For any perceived errors, nodes that are in error-active mode issue an active error flag/frame which consists of 6 dominant bits. So, the transmitted frame causes other nodes to violate the bit-stuffing rule, transmit their own error frame caused by stuff error, and terminate any on-going transmissions/receptions.

For nodes that are in error-passive mode, they operate in the same manner as error-active ones, except that they issue a passive error flag which consists of 6 recessive bits and have an 11 (not 3) bit-time of IFS if they were the transmitter of the previous message. Since recessive bits are overwritten on the CAN bus by any dominant bits, issued passive error flags do not distract any on-going bus communications.

Next, an adversary model under consideration is discussed. Consider an adversary whose objective is to shut down uncompromised/healthy in-vehicle ECUs in an elusive manner, i.e., only a subtle change in the in-vehicle network behavior while mounting attacks. Such an objective thus precludes any other types of attacks (e.g., jamming, interruption) which, albeit their larger impact, are much less elusive and thus easier to be detected/removed. The elusiveness of such attacks is discussed further below, highlighting the severity of the bus-off attack. Adversaries can either physically or remotely compromise an in-vehicle ECU through numerous attack surfaces and means. Once an in-vehicle ECU is compromised, consider the adversary to be capable of performing at least the following malicious actions. First, since the contents of arbitration, control, and data fields in the CAN frame are managed at user/application level, the adversary can inject any message with forged ID, DLC, and data on the bus. Second, since CAN is a broadcast bus, the adversary can sniff messages on CAN. These are the basic capabilities of an adversary who has the control of a compromised ECU. Practicability of such an adversary model has already been proved and demonstrated. An adversary has also been shown to be able of jamming/interrupting the CAN bus, reverse-engineering the CAN messages for vehicle maneuver, reprogramming ECUs, etc.

Once an ECU is compromised, it is easy for the adversary to mount the proposed bus-off attack. For instance, in contrast to previously demonstrated attacks, it need not go through the painstaking procedure of reverse-engineering in order to identify the meaning or purpose of a specific message when mounting the attack. Moreover, the adversary is not required to modify the CAN protocol itself for mounting the bus-off attack.

The bus-off attack exploits the following feature of CAN's safe mode: the CAN's error handling automatically isolates defective or "misbehaving" ECUs—whose TEC>255—into bus-off mode. Specifically, by iteratively injecting attack messages on the CAN bus, the adversary coerces the transmit error counter (TEC) of an uncompromised/healthy victim ECU to continuously increase—deceiving the victim into thinking it is defective—and in the end, triggers the CAN fault-confinement scheme to force the victim or even the entire network to shut down.

Consider a case where message $M$ is periodically sent by some victim ECU $V$. In such a case, an adversary $A$ can succeed in a bus-off attack by injecting an attack message, which satisfies the following three conditions.

C1. ID—Same ID as message $M$;
C2. Timing—Transmitted at the same time as $M$; and
C3. Contents—Having at least one bit position in which it is dominant (0), where in $M$, it is recessive. All precedent bits should be the same as $M$.

For now, to describe the attack model, assume that the adversary can construct and transmit a message that satisfies C1-C3. Details of how and why C1-C3 can be met will be discussed below.

Figure 4:
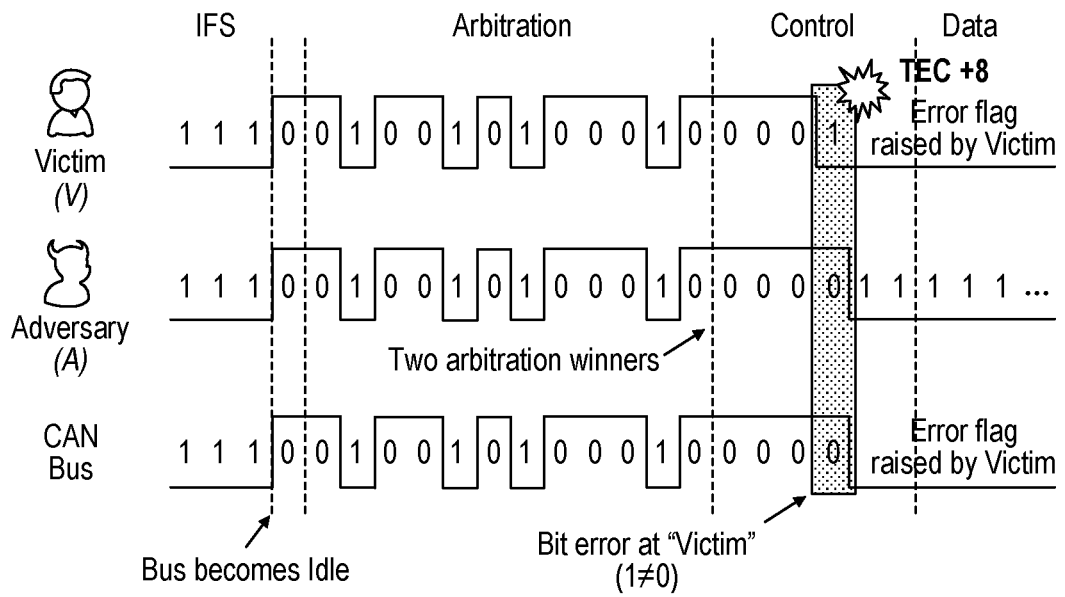
FIG. 4 is a diagram showing an example of a bus-off attack; stuffed bits are omitted for the sake of simplicity.

As shown in FIG. 4, when the bus becomes idle, not only the victim transmits message $M$ but also the adversary transmits an attack message satisfying C1-C3. Accordingly, not one but two transmitters—$A$ and $V$ which are sending messages with identical IDs—win arbitration, and thus concurrently send their bit values of control, data, CRC, and so forth, on the bus. Note that bitwise transmission of the two nodes is synchronized in virtue of CAN's hard and soft synchronization. Since the attack message meets C3, $V$ monitors an opposite polarity signal on the bus to the one it transmitted (this happens after an arbitration). As a result, the victim node $V$ suffers a bit error forced by $A$, thus increasing its TEC by 8, i.e., the adversary succeeds in increasing the uncompromised/victim ECU's TEC by injecting an attack message.

By repeating this bus-off attack on a certain message sent by the victim, the adversary can make the victim's TEC to continuously increase, and achieve its goal of forcing the victim to enter bus-off mode and disconnect from the bus. Although the victim is error-free in transmitting messages other than the targeted one, since TEC increases by 8 upon detection of each error but decreases only by 1 for each error-free transmission, an iterative bus-off attack rapidly increases the victim's TEC. The whole procedure of an iterative bus-off attack consists of two phases.

Figure 5A:
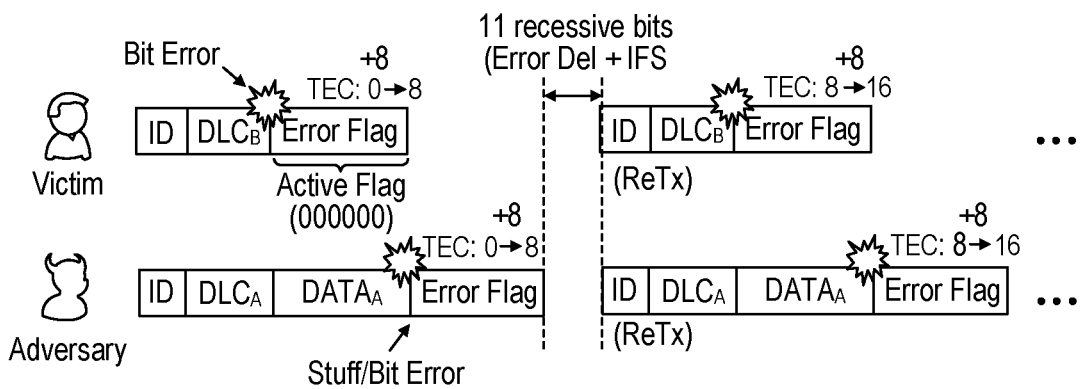
FIG. 5A is a diagram showing first phase on a bus-off attack, where the bit errors at both nodes recur until they both enter error-passive mode.

In Phase 1, the victim is in error-active mode. Both adversary and victim nodes start in their default mode, error-active. By observing the CAN bus, the adversary learns the Tx timing of certain periodic messages, and targets one of them for a bus-off attack. Such a message is referred to as the target message and its transmitter as the victim. As mentioned earlier, the adversary then injects its attack message at the same time as the target message to increase the victim's TEC. Thus, as illustrated in FIG. 5A, the victim experiences bit error, transmits an active error flag, and increases its TEC by 8. Since an active error flag consists of 6-consecutive dominant bits (i.e., 000000), either a stuff error or a bit error is triggered at the adversary node, and its TEC also increases by 8.

After the error delimiter and IFS, the CAN controllers of the adversary and the victim automatically retransmit the Tx-failed messages again at the same time. So, the exact same bit error recurs until they both enter error-passive mode. What is significant about the attack in Phase 1 is that the adversary is capable of coercing the victim to become error-passive with just one injected attack message.

Figure 5B:
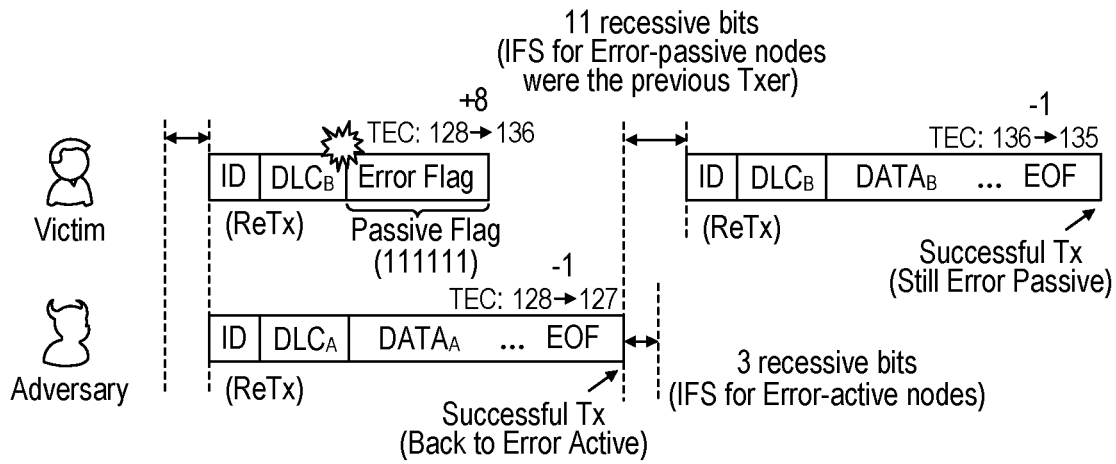
FIG. 5B is a diagram showing a transition from a first phase to a second phase, where both nodes enter this stage with error-passive mode, but only the adversary recovers back to error-active mode.

During transition from Phase 1 to 2 and after 16 (re)transmissions, both the adversary and the victim concurrently enter the error-passive mode when their TEC=128 as shown in FIG. 5B. Again, for the retransmitted message, a bit error is triggered at the victim node. However, since the victim is now in error-passive mode, it transmits a passive error flag which consists of 6 recessive bits (i.e., 111111). Hence, in contrast to Phase 1, the adversary node experiences no error and thus succeeds in his message transmission; whereas, the victim succeeds later on during retransmission.

In total, due to a bit error (+8) and successful retransmission (−1), the victim's TEC changes 128→136→135; whereas, the adversary's TEC changes 128→127. Accordingly, the adversary returns to error-active, while the victim remains error-passive. Note that, up to this point, all but the first change in TEC are achieved via automatic retransmissions by the CAN controller, i.e., the controller does it all for the attacker!

Figure 5C:
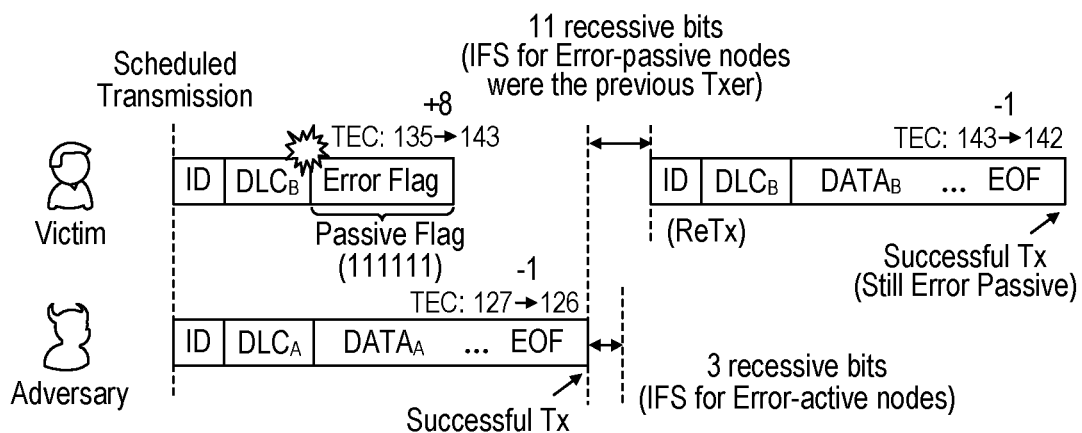
FIG. 5C is a diagram showing the second phase of a bus-off attack which leads the victim to enter bus-off mode.

In Phase 2, the victim enters in error-passive mode. FIG. 5C illustrates Phase 2 of the bus-off attack in which only the victim is error-passive. Once the scheduled interval of the target message has elapsed, the victim again transmits that message, and thus at the same time, the adversary re-injects its attack message. Since the victim is still in error-passive mode, as it was the case when transitioning from Phase 1 to 2, the adversary is capable of decreasing its TEC further by 1. On the other hand, the victim's TEC is again increased by 7 (=+8−1), thus keeping the victim in error-passive mode.

In Phase 2, the adversary iterates this process for every periodically transmitted target message until the victim is eventually forced to bus off, i.e., the victim's TEC>255. This implies that the periodicities of the attack and the target messages are the same. As a result, the victim ECU becomes disconnected, and in the worst case, the entire bus system shuts down. The adversary may attempt to iterate this process for not only every periodic transmission but also every retransmission (similarly to Phase 1). However, as shown in FIG. 5C, since error-passive nodes, which were the transmitter of the previous message, have a longer IFS than error-active nodes, the adversary cannot synchronize its injection timing with the victim's retransmission, i.e., fails to mount the attack on retransmitted messages.

During Phase 1, due to use of only a single attack message, the victim (re)transmits its message for at least $$\frac{128}{8} = 16$$

consecutive times. Let $D_{pass}$ denote the duration of such a phase which only lasts until the victim becomes error-passive. Then, for every period of $T_{target}$, which is the same as the period of the target message and thus the attack as well, the adversary mounts attack Phase 2. For every such attempt, the victim's TEC is forced to increase by 7, and eventually the victim ECU enters the bus-off mode. Hence, the total delay in making the victim disconnected, $D_{off}$, can be determined as:

$$D_{off} = D_{pass} + \left\lceil \frac{255-135}{7} \right\rceil T_{target} \quad (1)$$
$$= D_{pass} + 18 T_{target}.$$

Since transmissions in Phase 1 are fairly short compared to Phase 2, and occur consecutively, $D_{pass} \ll T_{target}$. Thus, according to Eq. (1), $D_{off}$ is mostly determined by $T_{target}$ i.e., the period of the target message. This equation suggest that if the target message is sent more frequently, $D_{off}$ can be lowered, implying a critical consequence of the bus-off attack; the adversary can more rapidly shut down ECUs sending messages at shorter intervals, i.e., more safety-critical (e.g., powertrain control) ECUs. For example, to shut down an ECU sending the odometer reading every 1 sec., it takes approximately 18 secs; whereas, to shut down an Anti-lock Braking System (ABS) ECU sending the measured wheel speed values every 10 ms, it takes only about 180 ms.

In order to succeed in mounting the bus-off attack, it is essential for the adversary to inject an attack message that satisfies conditions C1-C3 on ID, timing, and contents. To trigger a bit error at the victim and increase its TEC, the attack message first has to satisfy C3: having at least one bit position in which its signal is dominant (0), whereas the victim's is recessive (1), and all preceding bits are identical. Since the bus-off attack also requires the attack and target messages to have the same ID (i.e., C1—identical arbitration fields), the mismatch in C3 must occur in either the control or the data field. Note that this is infeasible in other fields such as CRC, ACK, and EOF, because they are determined by the CAN controller, not by the user or adversary. Since CAN messages normally have DLC set to at least 1 (0001) and non-zero data values, one simple but most definite way for the adversary to cause a mismatch is to set the attack message's DLC or data values to all 0s. Also, given that DLC for each CAN ID is usually constant over time, the attacker can learn the value and set its attack message's DLC accordingly. This way, the adversary can satisfy C3.

The next difficult task is to meet C1, which requires the attack message to have the same ID as the target. That is, the adversary must know in advance the ID used by the target message. The fact that favors the adversary is that CAN is a broadcast bus system, i.e., ECUs get to "see" all messages on the bus. However, each ECU cannot acquire the IDs of all received messages except those passed through its message filter. Message filtering is based on message IDs and is for the ECU to process only those required for its operation. A received message is distinguished from an accepted message, depending on whether it passed through the filter and then arrived at the user-level application. Since an adversary can read contents only from accepted messages, meeting C1 depends on how the filter is set at the compromised ECU.

Some ECUs in vehicles have almost, if not completely, empty message filters so that they can receive, accept, and process almost all messages on the bus, thus making it trivial to satisfy C1. A typical example of these ECUs is the telematic unit, which has to operate in that way to provide a broad range of features, e.g., crash reporting, remote diagnostics/prognosis, anti-theft, infotainment. Another interesting aspect of this ECU is that, from a security viewpoint, it is regarded as one of the most vulnerable ECUs due to its wide range of external/remote attack surfaces. Note that several researchers have already shown the practicability of compromising the telematics unit. So, this implies that an adversary can compromise some empty filter ECUs more easily than those with non-empty filters, thus satisfying C1, i.e., the nature of how certain ECUs are built helps the adversary succeed in mounting a bus-off attack.

Although the message filter of a compromised ECU is preset to accept messages with only a few different IDs, it does not restrict the adversary in attacking them. Furthermore, by directly modifying the message filter, the adversary can also mount the attack on messages that would usually have been filtered out. The two most common CAN controllers—Microchip MCP2515 and Philips SJA1000—both allow modification and disabling of message filters through software commands, when the ECU is in configuration mode. For ECUs with the Microchip MCP2515 CAN controller, the configuration mode can be entered not only upon power-up or reset but also via user instructions through the Serial Peripheral Interface (SPI). Through the SPI, it is also possible for the user to read/write the CAN controller registers, including the filter register. Thus, such user-level features for configuring the CAN controller allow attackers to easily enter configuration mode via software commands, and modify/disable the message filters, thus satisfying C1.

In order to learn the IDs of messages, instead of directly modifying the filter, the adversary can also infer them. Consider a case where the bus always remains busy whenever the compromised ECU has finished its transmission or acceptance of message $I$. In such a case, the adversary can acknowledge that some unknown message $\mathcal{U}$ is always being sent on the bus after $I$, but without knowing its ID. Through an analysis of actual CAN bus traffic data it is shown that such a scenario is prevalent in in-vehicle networks.

To infer the ID of $\mathcal{U}$, the adversary can exploit the fact that a message with the lowest ID wins arbitration, and can thus act as follows. Upon finishing transmission/reception of $I$, the adversary first injects a message with the highest possible ID, i.e., 0x7FF (eleven 1s), and a randomly selected DLC. This will make the adversary likely lose arbitration but learn that message $\mathcal{U}$'s ID<0x7FF. Hence, once transmitting/receiving $I$ again, the adversary will try to transmit the message again, but with a decremented ID=0x7FE. The adversary iterates this procedure of decreasing the ID value and transmitting the message always after $I$, until it does not lose arbitration and triggers a bit error. If a bit error did not occur at the time when the adversary began not losing arbitration, this indicates that the adversary's message ID is not equal to, but lower than the target's. This is when the IDs of the adversary's message and $\mathcal{U}$ are the same, i.e., the adversary has correctly inferred the ID of $\mathcal{U}$. This way, albeit being less elusive, the adversary can satisfy C1 via inference, even for messages that cannot pass through its message filter.

Although we have shown a way of just decrementing the ID by 1 for each iteration, the adversary can also narrow down the possible range of $\mathcal{U}$'s ID via fuzzing or any other reasonable (binary search) algorithm. Of course, one main drawback of inferring the ID is that there could be multiple numbers of distinct messages being in place of $\mathcal{U}$, and the adversary may thus have to iterate the process multiple times.

Even though the adversary meets C1 and C3 (i.e., knows the ID and contents to use for its attack message), it is important to exactly know when to send the attack message. Unless the adversary is capable of sending the attack message at the same time as the target message, not only once but iteratively, he would fail to cause a bit error, or increase the victim's TEC.

C2 requires the transmission of the attack and the target messages to be synchronized with less than a bit resolution. If the timing of the attack is wrong by even one bit, there won't be two arbitration winners and the bus-off attack would thus fail. For synchronizing the timing of its transmission, the adversary may utilize the fact that CAN messages are usually sent at fixed intervals, e.g., 5 or 10 ms. For example, once the adversary learns that the target message is sent every T ms, it can attempt to transmit its attack message when T ms has elapsed since the target's last transmission. However, such an approach would be inaccurate due to jitters. Since jitters make the actual message periodicities deviate from their preset values, albeit leveraging message periodicity to fulfill C2, the attacker would have difficulties in synchronizing the transmission of its attack message with the target's.

In order to overcome these difficulties, the adversary can exploit another fact of the CAN protocol: nodes, which have either lost arbitration or had new messages buffered while the bus was busy, attempt to transmit their messages as soon as the bus becomes idle, i.e., they are coerced to buffer their messages until the current message transmission on the bus is completed.

Figure 6:
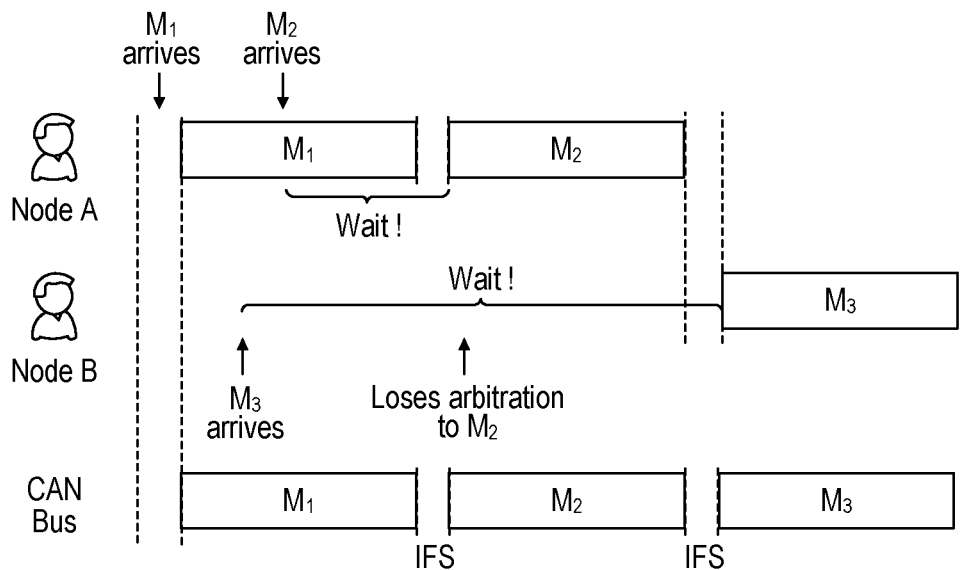
FIG. 6 is a diagram illustrating how the preceded IDs $M_1$ and $M_2$ allow the transmission timings of $M_2$ and $M_3$ to be predictable and determinative.

Define a preceded ID of $M$ as the ID of the message that has completed its transmission right before the start of $M$'s. Consider an example where node A transmits messages with ID=$M_1$, $M_2$, and node B transmits a message with ID=$M_3$, which has the lowest priority among them. As shown in FIG. 6, if these messages are arriving and being queued at the depicted times, $M_1$ and $M_2$ would be the preceded IDs of $M_2$ and $M_3$, respectively, with only a 3-bit IFS separating the corresponding pairs. In other words, the transmissions of $M_2$ and $M_3$ are forced to be buffered until their preceded ID messages have been transmitted on the bus.

Since message priorities and periodicities do not change, such a feature implies that one particular CAN message may always be followed by another specific message, i.e., there is a unique preceded ID for that specified one. As an example, if the periodicities of their transmissions are either same or n-folds (e.g., 5 ms for $M_1$ and $M_2$, and 10 ms for $M_3$), then $M_2$ would always be the preceded ID of $M_3$, i.e., be the unique preceded ID. Hence, regardless of the amount of jitter, the exact timing of message transmissions becomes rather predictable and even determinative: 3 bit-time after the preceded ID's completion.

In the above example, to attack $M_3$, the adversary can monitor the CAN bus, learn its preceded ID of $M_2$ or even $M_2$'s preceded ID of $M_1$, and buffer an attack message with ID=$M_3$ when receiving one of them. Then, its CAN controller would always transmit the attack message after $M_2$'s transmission (i.e., concurrently with the target message), and the adversary will thus succeed in the bus-off attack. Likewise, the adversary can target $M_2$ by buffering its attack message with ID=$M_2$, as soon as it receives its preceded ID of $M_1$. If the preceded ID is unique, then the bus-off attack can be iterated for its every reception and thus consecutively increase the victim's TEC.

Even though the target message does not have such a preceded ID, an adversary can fabricate it in order to synchronize the timing and thus succeed in mounting the bus-off attack. Consider an example shown in FIG. 7 where a victim node periodically transmits message $U$, which has no preceded IDs. In such a case, just before the transmission of $U$, the adversary can inject some message $P$ and an attack message $A$, sequentially. Hence, $V$'s transmission gets delayed until the completion of $P$, i.e., the adversary fabricates $P$ as the preceded ID of $V$, and thus the attack message is concurrently sent as its target. Extensive evaluation results presented below will demonstrate the practicability and efficiency of bus-off attacks based on the above approaches.

The key point in meeting C2 and ultimately succeeding in the bus-off attack is leveraging the preceded IDs of the target message. Depending on the configuration and scheduling of messages, some target messages may (or may not) have a preceded ID. We first consider the case in which the adversary is targeting messages with genuine (unfabricated) preceded IDs. Hence, it is essential to verify their existence in actual CAN traffic as well as their usefulness in satisfying C2. In other words, the following questions should be answered: are there such preceded IDs in real in-vehicle network traffic? If so, how many distinct preceded IDs are there for a specified message? If more than one, are there any inherent patterns in the preceded IDs, which can be utilized by the attacker to meet C2 and mount a bus-off attack?

These three questions are answered through an analysis of actual CAN traffic data. Reference may be made to a CAN bus traffic data that was recorded from a 2010 Toyota Camry. During a 30-minute test drive, the data was logged by a Dearborn Group Gryphon S3 and Hercules software. According to the logged data, there were 42 distinct messages transmitted on the CAN bus: 39 of them sent periodically at intervals ranging from 10 ms to 5 seconds, and 3 of them sent sporadically. These messages include information such as wheel speeds, steering data, brake pressure, etc.

Figure 8:
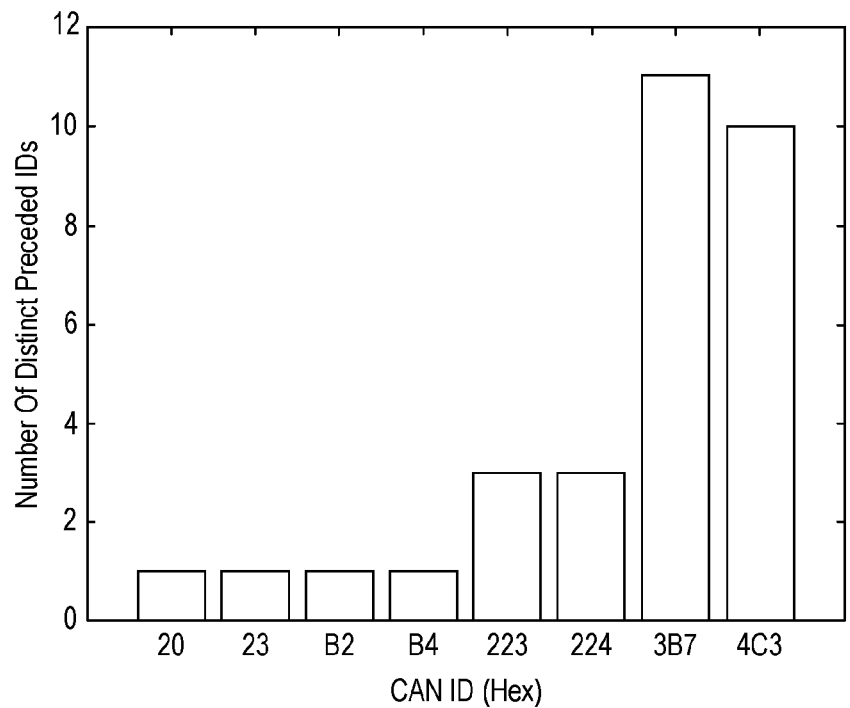
FIG. 8 is a graph showing the number of distinct preceded IDs, where some messages have multiple preceded IDs, whereas others have unique ones.

Of these, the ones of interest are identified: messages that are always sent right after another's completion, i.e., have preceded IDs (e.g., $M_{z2}$ or $M_{z2}$ in FIG. 6). Of the 39 periodic messages seen on the bus, 8 met this criterion. FIG. 8 shows the number of distinct preceded IDs of the ones labeled in the x-axis. For example, message 0xB2 had a unique preceded ID 0xB0, i.e., 0xB2 always followed 0xB0, where both were sent every 10 ms. On the other hand, message 0x3B7 had 11 different kinds of those IDs. The result showing that 10% of the periodic messages have a unique preceded ID answers the question of their existence as well as uniqueness in actual CAN bus traffic, and thus implies that the bus-off attack exploiting genuine preceded IDs is indeed feasible in actual vehicles. Since in-vehicle messages have fixed priorities, are sent periodically, and some have to be sent consecutively by an ECU (e.g., two messages containing front and rear wheel speed values), it is believed that preceded IDs are prevalent in all other types of passenger cars as well.

Another interesting aspect of the CAN bus traffic was that there were notable patterns in the preceded IDs. As shown in FIG. 8, message 0x223 with periodicity 30 ms had 3 distinct preceded IDs, meaning that observing those IDs may not help determine the transmission timing of 0x223. However, an interesting pattern in their transmission was extracted: the 6n-th transmission of 0x20 was the unique preceded ID of the 2n-th transmission of 0x223, where n is an integer. That is, even through a unique preceded ID was not observable for every transmission, it was for every n-fold transmission, i.e., there exists a pattern in preceded IDs. Therefore, by observing the CAN bus traffic, acquiring knowledge of genuine preceded IDs as well as their patterns, and thus meeting not only C1, C3 but also C2, the adversary can succeed in mounting an iterative bus-off attack.

Figure 7:
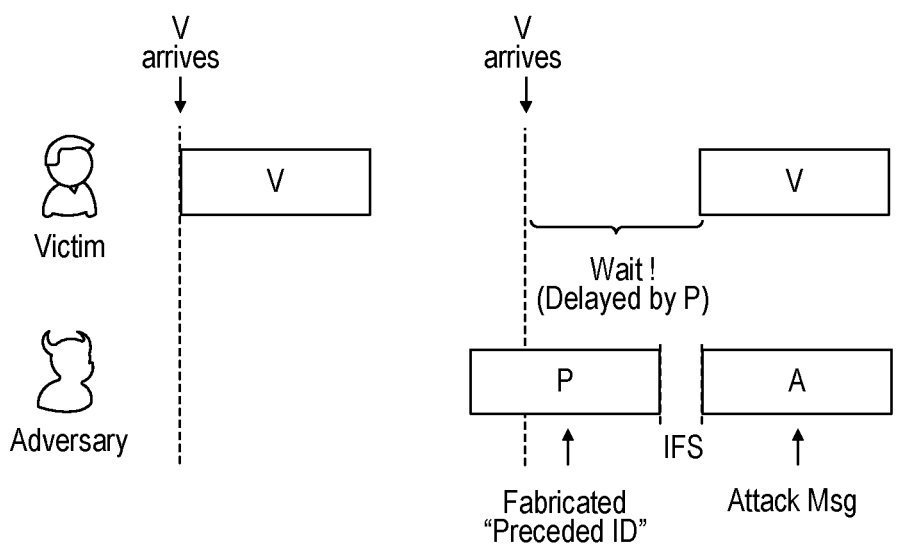
FIG. 7 is a diagram showing how an adversary injects message $\tilde{P}$ to enforce it to be the preceded ID of the victim's message $V$.

Even though the targeted messages do not have a preceded ID, as shown in FIG. 7, the adversary can fabricate it to meet C2. Therefore, these preceded ID messages are referred to as being fabricated by the adversary. When mounting the bus-off attack via (fabricated) preceded IDs, the following three factors must be considered:

Timing—When should the adversary start injecting the preceded ID message(s)?
Quantity—How many injections are required?
Contents—What ID and contents should be used?

To succeed in the bus-off attack via fabrication of preceded IDs, it is essential for the adversary to inject that fabricated message right before the target message. In other words, the adversary is required to estimate when the target message would be transmitted on the bus. Although most in-vehicle messages have fixed periodicity, randomness incurred from jitters makes such estimation rather difficult.

Figure 9:
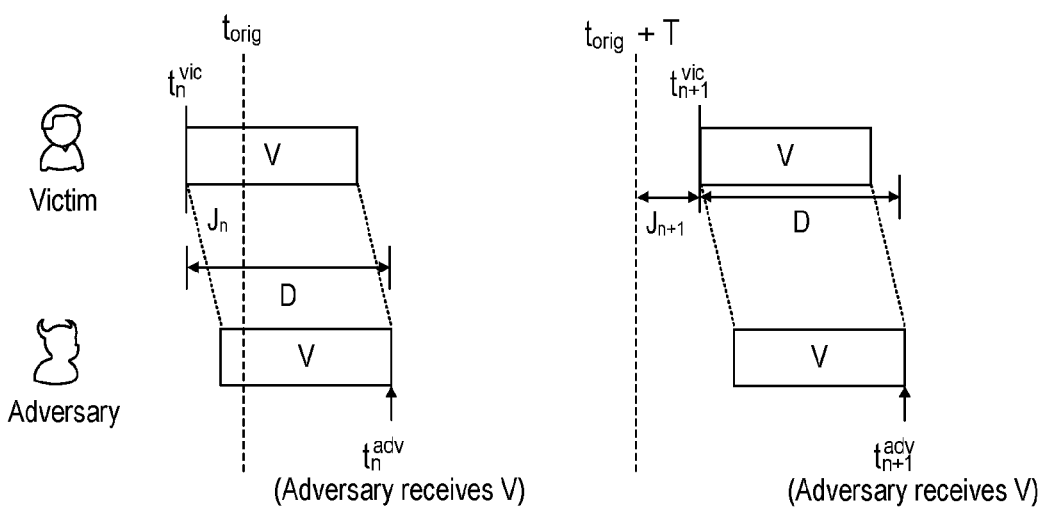
FIG. 9 is a diagram showing an analysis of when to inject the preceded ID message.

Referring to FIG. 9, consider a target message $V$ with periodicity of T, which is expected to be transmitted at times $t_{orig}$, $t_{orig}+T$ and thereafter. Note that T is a predefined and constant value for periodic messages. However, due to the jitters of J and $J_{n+1}$—caused by variations in the transmitter node's task scheduling, execution time, etc. —the victim's messages are transmitted on the bus at times and $t_n^{vic}$ and $t_{n+1}^{vic}$, where n is the sequence index. From the adversary's perspective, due to an incurred delay of $\mathcal{D}$ from transmission and reception, it receives message $V$ at times $t_n^{adv}$ and $t_{n+1}^{adv}$. Note that $\mathcal{D}$ includes delays for message transmission, propagation, and processing. Since the number of bits in a certain message is almost a constant and the bit timing of CAN already takes into account of the signal propagation on the bus, without loss of generality, one can assume D to be constant for a given message $V$.

Thus, the only remaining randomness in the timing of message transmission is jitter (e.g., $J_n$). Jitter is known to follow a Gaussian distribution due to randomness in thermal noise, which also follows a Gaussian, and the Central Limit Theorem, i.e., composite effects of many uncorrelated noise sources approach a Gaussian distribution. So, one can consider $J_n$ and $J_{n+1}$ as outcomes of a Gaussian random variable $J \sim N(0, \sigma_v^1)$. Thus, the times when the adversary receives and acknowledges $V$ can be expressed as:

$$t_n^{adv} = t_n^{vic} + \mathcal{D} = t_{orig} + J_n + \mathcal{D}, \quad (2)$$

$$t_{n+1}^{adv} = t_{n+1}^{vic} + \mathcal{D} = t_{orig} + T + J_{n+1} + \mathcal{D}, \quad (3)$$

where $J_n < 0$ and $J_{n+1} > 0$ in FIG. 9. Then, $$\begin{aligned} t_{n+1}^{vic} &= t_n^{adv} + T - \mathcal{D} + J_{n+1} - J_n \\ &= t_n^{adv} + T - \mathcal{D} + J^*, \end{aligned} \quad (4)$$

where $J^* \sim N(0, 2\sigma_v^2)$ since its outcomes are $J_{n+1} - J_n$. Note that in Eq. (4), $J^*$ is the only random variable whereas others are either constant or measurable by the adversary. Such an equation shows that the adversary can indeed obtain an approximately estimation of when the victim would transmit its message, i.e., the target message, at the next sequence.

As shown in FIG. 7, for the fabrication of preceded IDs to be effective, the adversary has to 1) start transmission of its preceded ID message(s) before the target and 2) hold the CAN bus, i.e., make the bus busy, until it becomes sure that the attack and target messages would synchronize. In other words, the adversary must meet the following three conditions:

1) $t_{fab} < \min(t_{n+1}^{vic}) = t_n^{adv} + T - \mathcal{D} + \min(J^*)$

2) $t_{fab} + \mathcal{H} > \max(t_{n+1}^{vic}) = t_n^{adv} + T - \mathcal{D} + \max(J^*)$ 3) $\mathcal{H} = \mathcal{K} \cdot \mathcal{F} > \max(J^*) - \min(J^*), \quad (5)$ where $t_{fab}$ denotes when the adversary starts to inject its fabricated preceded ID message(s). Moreover, $\mathcal{H}$ denotes the duration of the adversary holding the bus, which is equivalent to $\mathcal{K}$ preceded ID messages each sent for a duration of $\mathcal{F}$.

Since $J^*$ is a bounded Gaussian random variable, the boundaries can either be measured or approximated as $|\max(J^*)| = |\min(J^*)| \simeq \mathcal{I}\sqrt{2}\sigma_v$, where $\sigma_v$ is measurable, and $\mathcal{I}$ a parameter for the attack. Since $J^*$ is a Gaussian, setting $\mathcal{I}=3$ would provide a 99.73% confidence and $\mathcal{I}=4$ a 99.99% confidence. In total, to fully exploit the fabricated preceded IDs, the adversary has to start injecting them prior to $t_n^{adv} + T - \mathcal{D} - T\sqrt{2}\sigma_v$. Note that the adversary should not lower $t_{fab}$ beyond $\max(t_{n+1}^{vic}) - \mathcal{H}$, i.e., satisfy 2), which can be set once $\mathcal{H}$ is determined.

Figure 10:
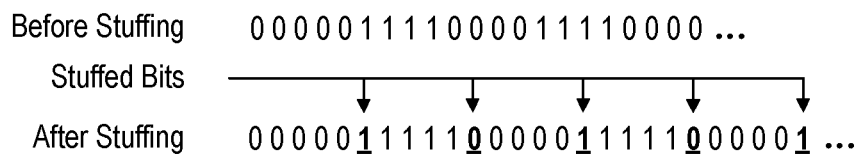
FIG. 10 is a diagram showing how to exploit the bit-stuffing rule of CAN, so that the adversary can maximize the number of stuffed bits and thus the duration of transmission.

Once satisfying 1) in Eq. (5), the adversary has to satisfy 3)—occupy the bus at least for the duration of $\max(J^*) - \min(J)^* = 2\sqrt{2}\mathcal{I}\sigma_v$, which can be met via $\mathcal{K}$ ($\geq 1$) injections of preceded ID messages. Since the adversary's objective is to mount the bus-off attack as stealthily as possible, $\mathcal{K}$ should be kept to minimum by maximizing $\mathcal{F}$. To maximize $\mathcal{F}$, i.e., the duration of its preceded ID message occupying the bus, the adversary can exploit the bit-stuffing rule of CAN: after every 5 consecutive bits of the same polarity (e.g., 00000), an opposite polarity bit is stuffed. By fabricating its preceded ID message with DLC=8 and the data field as shown in FIG. 10, the adversary can maximize the number of stuffed bits and thus $\mathcal{F}$ to at least:

$$\mathcal{F}^* = \left(8L + 44 + \left\lfloor \frac{8L}{4} \right\rfloor \right) \Big/ S_{bus} = \frac{124}{S_{bus}}, \quad (6)$$

where 44 denotes the number of bits exterior to the data field, L the DLC=8, and $S_{bus}$ the bus speed. Note that at least $$\left\lfloor \frac{8L}{4} \right\rfloor$$

bits are added to the fabricated message according to the CAN's bit-stuffing rule, whereas the number of other stuffed bits is omitted for the sake of simplicity of presentation. Hence, if one consider the bus-off attack on a CAN bus with $S_{bus}=500$ Kbps, using a single injected preceded ID message, the adversary can take control of the bus for at least 0.248 ms. Such analyses suggest that for targeting a message with a jitter deviation of $\sigma_v$, the adequate number of preceded ID messages can be expressed as:

$$\mathcal{K} = \left\lceil \frac{\max(J^*) - \min(J^*)}{\mathcal{F}^*} \right\rceil = \left\lceil \frac{2\sqrt{2}\mathcal{I}\sigma_v S_{bus}}{124} \right\rceil. \quad (7)$$

For example, if $\sigma_v=0.025$ ms and $S_{bus}=500$ Kbps, the adversary is only required to inject $\mathcal{K}=\lceil 0.8554 \rceil=1$ preceded ID message with $\mathcal{I}=3$, i.e., 99.73% confidence for a one-time attack. To ensure the effectiveness of the fabricated preceded IDs and achieve a near-perfect confidence, the adversary can set $I=4$ and thus inject $k=\lceil 1.1405\rceil=2$ messages at time $t_{fab}$. An evaluation will later show that one injection of fabricated ID messages ($k=1$) can be sufficient (i.e., being significantly elusive) for a bus-off attack.

Other than the control and data fields, the adversary also has to carefully decide which ID to use for fabricating the preceded ID messages. If only one preceded ID message is to be used for the attack, the adversary can exploit the next seemingly free ID. To make the attack as elusive as possible, the ID value can be changed for each attempt of attack and be chosen from those least frequently sent on the bus. Note that in such a case, the preceded ID value does not necessarily have to be lower than the target message since the adversary would have occupied the bus before the victim attempts to transmit its message, i.e., arbitration does not occur. If two preceded ID messages are to be used, the adversary can similarly inject the first one with any free ID but should inject the second one with an ID having higher priority (smaller value) than the target.

Figure 11:
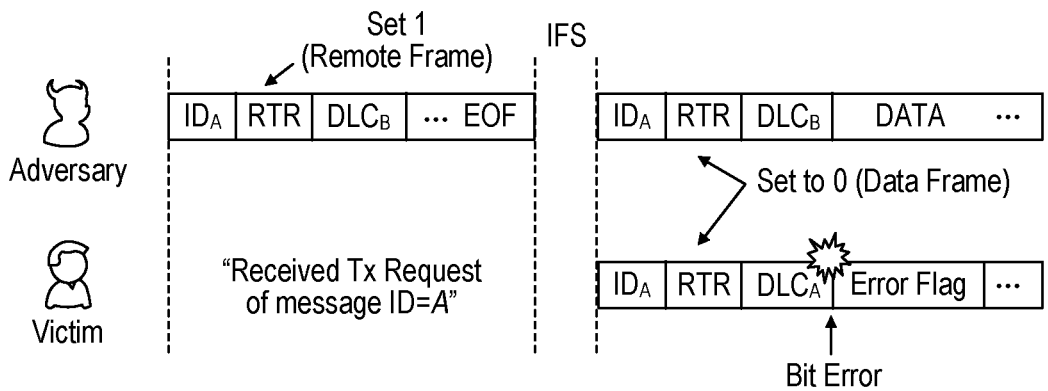
FIG. 11 is a diagram showing how an adversary exploits remote frames for mounting a bus-off attack.

The most difficult challenge in mounting the bus-off attack is meeting C2: matching the exact transmission timing. However, when request-response message pairs are utilized, it becomes easier to meet C2. As an example, in the CAN protocol, a remote frame is used for requesting immediate transmission of a specified message. Its arbitration field is filled with the ID of the required message, RTR bit is set to 1, and the data field is removed. When an ECU receives a remote frame requesting a message that it usually transmits, it immediately responds by sending the requested data frame on the CAN bus. With reference to FIG. 11, the adversary can exploit this capability of a remote frame to force the victim to transmit the targeted message at an expected time, thus succeeding in mounting a bus-off attack. On the other hand, the probability of succeeding in such a way depends on the capability and status of the victim node. It requires the victim to process and buffer the required data frame before the end of IFS. Other than CAN, higher-layer protocols such as GMLAN, ISO 15765-4, and CANopen also provide similar request-response message pairs, which can thus be exploited by the adversary to mount a bus-off attack easily.

Figure 12:
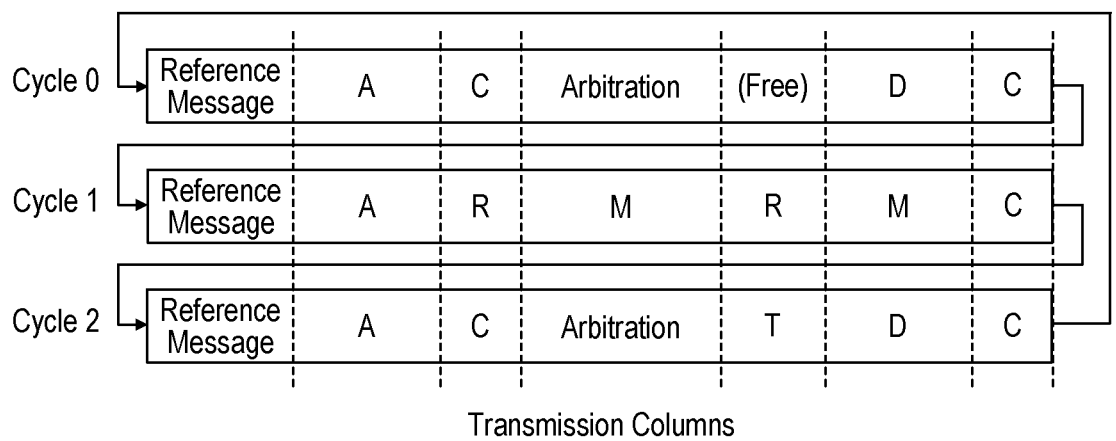
FIG. 12 is a diagram showing how TTCAN uses a schedule matrix for time-triggered communications.

More advanced automotive control systems require hard real-time constraints to be met in exchanging in-vehicle messages. Accordingly, time-triggered protocols have been proposed and are starting to be used in passenger vehicles to provide X-by-Wire functionalities, which traditional event-triggered CAN cannot. A notable example of such protocol is Time-Triggered CAN (TTCAN), which is a session-layer protocol realized in software and standardized in ISO 11898-4. Message transmissions are based on a static schedule time-triggered paradigm to provide determinism in them. So, all ECUs transmit their messages only at their assigned time slots and are periodically synchronized through a broadcast reference message. As shown in FIG. 12, the allocated time slots are predefined in a schedule matrix and are stored in each node. This implies that the attacker—having control of a vehicle with a time-triggered protocol—is provided with the knowledge of what messages are sent and when, thus making the bus-off attack easier.

For in-depth analyses and discussions on the proposed bus-off attack, the bus-off attack is first evaluated on the CAN bus prototype, and then the evaluation is extended to a real vehicle. A CAN prototype is configured in which all three nodes were connected to each other via a 2-wire bus. Each node consists of an Arduino UNO board, which is based on the ATmega328 microcontroller, and a SeeedStudio CAN bus shield stacked on top of it. The CAN bus shield consists of a Microchip MCP2515 stand-alone CAN controller with SPI interface, MCP2551 CAN transceiver, and a 120Ω terminal resistor to provide CAN bus communication capabilities, i.e., CAN V2.0 protocol. For user-level operations such as packet injection, sniffing, and filtering, libraries provided by SeeedStudio can be leveraged.

The CAN bus prototype was set up to operate at 500 Kbps, which is typical for in-vehicle high-speed CAN buses. The standard 11-bit ID was used for CAN data frames. Three interconnected nodes were each programmed to replicate the scenario shown in FIG. 6, which was also commonly seen in actual CAN bus traffic: for every 10 ms, node A was programmed to send two consecutive messages with ID=0x07 and 0x09, and B to send one message with a lower priority of ID=0x11. Node B buffered its message when message 0x07 was received. Note that 0x07 and 0x09 become the genuine preceded IDs of 0x09 and 0x11, respectively. This evaluation of the bus-off attack is extended later to the case without assuming availability of genuine preceded IDs. Last, but not least, the third node was programmed as an attacker which learns any preceded IDs on the bus and iteratively launches the bus-off attack. In the evaluation, message 0x11 from B was set as the target message of the attacker. Hence, the attack message was set to have the same ID=0x11 but with a different DLC (=0). Since the targeted message had a period of 10 ms, the bus-off attack was iterated at the same time interval. For every message transmission/reception, the Transmit Error Count (TEC) of each node was read from their CAN controller register. The whole procedure of an iterative bus-off attack was re-initiated once a node entered the bus-off mode, and was examined for 1,000 times.

FIG. 13 shows how the TECs of the victim and the adversary change during an iterative bus-off attack. All of our 1,000 examinations show near-equivalent changes. In the initial stage (0~1.7 ms) of the attack, there was a steep rise in the TEC of both nodes. This is due to the fact that in Phase 1, with just one injected attack message, bit errors are incurred for not only the initial transmission but also all consecutive retransmissions as depicted in FIG. 5A.

Once the victim became error-passive, i.e., TEC>127, the attack entered its second phase (1.7~187.5 ms). Here, through successful message transmissions, the adversary was able to recover back to and remain in error-active mode. On the other hand, the victim experienced iterative bit errors during its transmissions, and eventually entered the bus-off mode when its TEC exceeded 255.

FIGS. 14A and 14B show magnified plots of the changes in the victim's TEC during the attack. In Phase 1, TEC monotonically increased due to the errors in all (re)transmissions. On the other hand, once the attack entered Phase 2, the difference in error mode lets the victim succeed in its transmission only after experiencing a bit error. Thus, whenever an attack message was injected by the attacker, the victim's TEC was first increased by 8 and then immediately decreased by 1. The net TEC increase of 7 eventually forced the victim to be disconnected from the bus (as a result of its TEC exceeding 255). These results confirm the properties of Phase 2 discussed above.

The bit-rate of the CAN bus can vary from 125 Kbps to 1 Mbps, depending on the bus length as well as its purpose. Moreover, depending on the number of ECUs, the number of messages, and their frequency, the bus load can also vary with time. Thus, in order to examine the practicability as well as the performance of a bus-off attack under different bus conditions, the same experiment was conducted as above for 1000 times, while varying the speed and load of the bus. Each time the average delays of the bus-off attack forcing a victim to enter error-passive and bus-off modes were measured since they represent the following interesting metrics:

M1. Required number of attack messages as they were injected every 10 ms.

M2. Success probability of the attack. If there was at least one attempt in which the attack failed, then the maximum deviation in delays would be at least its interval of 10 ms.

Figure 15A:
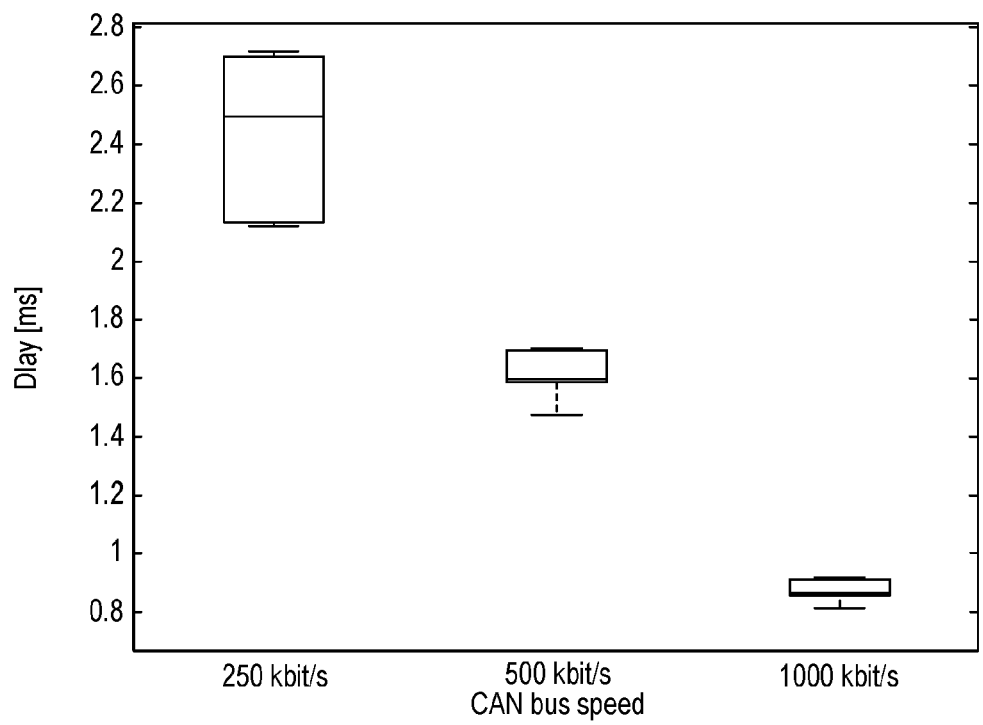
FIGS. 15A-15C are graphs showing the delay of a bus-off attack under different bus conditions—delay of forcing the victim to (a) enter error-passive under different bus speeds, (b) enter bus-off under different bus speeds, and (c) enter bus-off under different bus loads, respectively.
Figure 15B:
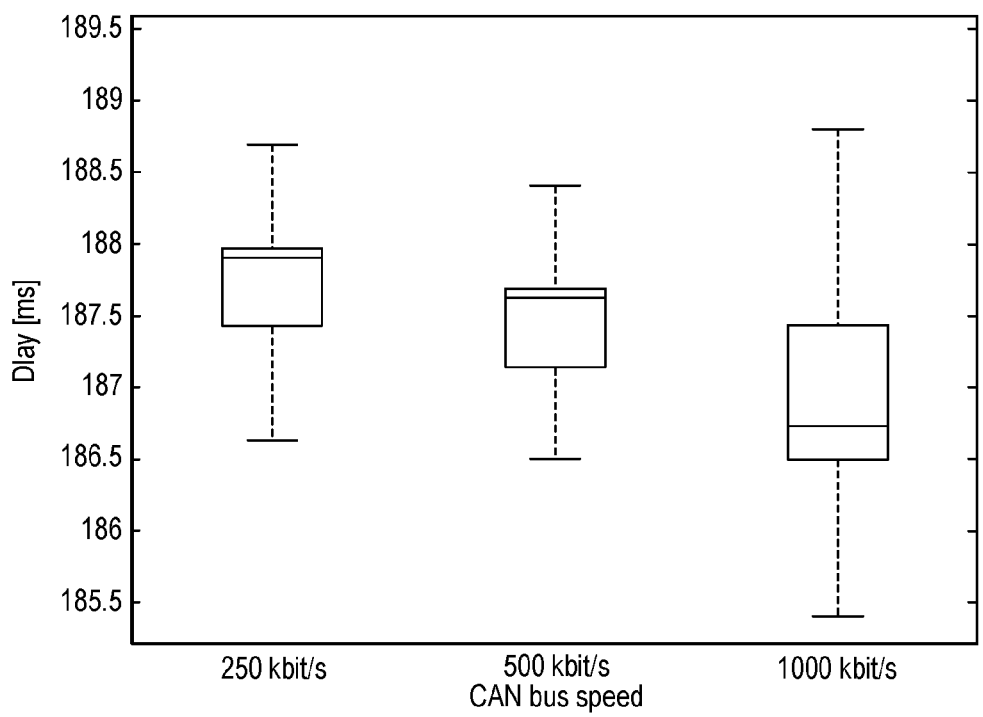

FIGS. 15A and 15B show box plots of the average delays of the bus-off attack in coercing the victim to become error-passive and bus-off, respectively. The bus speed was varied from 250 Kbps to its maximum of 1 Mbps. As shown in FIG. 15A, for all bus speeds, it took much less than 10 ms for the adversary to coerce the victim to become error-passive. Since the attack message was injected every 10 ms, this implies that only a single injection of the attack message was required. Also, observing that the maximum deviation was less than 10 ms, it shows that all attempted bus-off attacks succeeded irrespective of the bus speed. As the bus speed increased, the attacker was able to make the victim enter error-passive mode faster. This was because a higher bus speed enabled frame (re)transmissions to complete more quickly, thus increasing the victim's TEC more rapidly.

FIG. 15B shows the average total delay of the victim eventually becoming bus-off at different bus speeds. For all settings, the maximum deviation was less than 10 ms, again implying a 100% success probability of the attack. In contrast to the previous case, the delays were less dependent on the bus speed, which can be explained by Eq. (1). Since the second term of Eq. (1) is much larger than the first and independent of the bus speed, the total delay is almost independent as well, conforming to the evaluation result. Still, as the bus speed increases, due to the inverse-proportional relationship between bus speed and the delay of entering error-passive mode, the total delay tends to decrease.

Figure 15C:
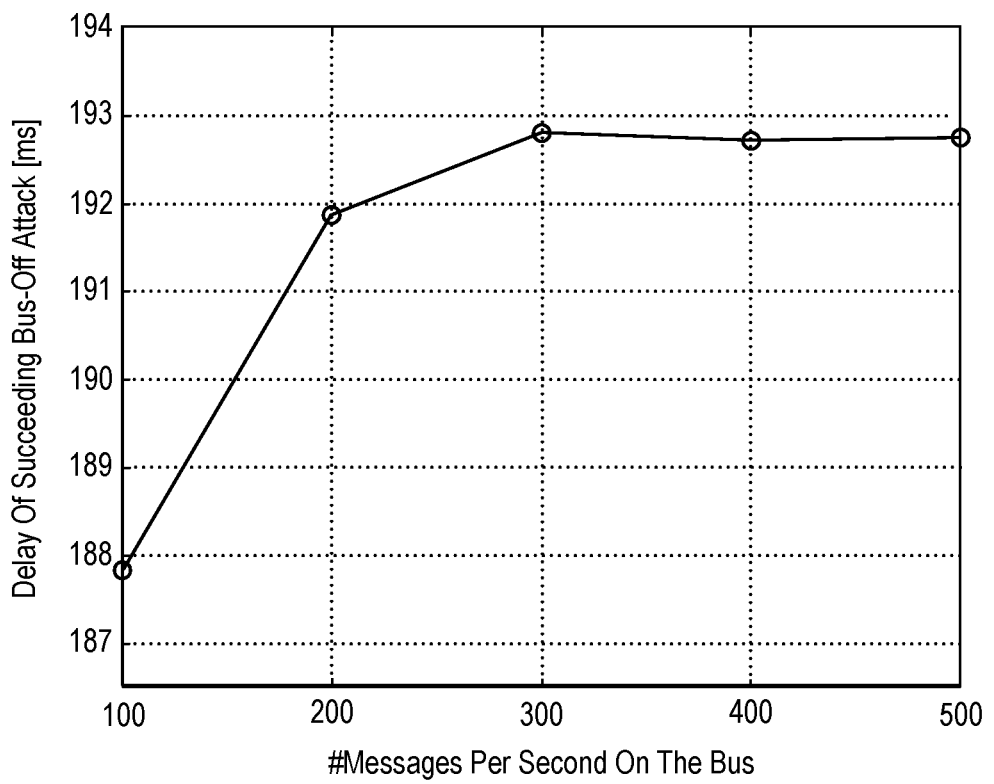

Not only the speed but also the load of the bus was varied in evaluating the attack. To form different bus load conditions, the node that was neither an adversary nor victim injected 100~500 messages per second. Their IDs were randomly chosen among the set of unused ID values, and their DLCs were set randomly between 1 and 8. FIG. 15C shows the average total delay of coercing the victim node to eventually bus off under the given bus loads. As the bus load increases, the overall delay is also shown to rise, because some of the randomly injected messages won arbitration over the target and attack messages and thus delayed their transmission. Note, however, that since they both had the same IDs, they equally won/lost arbitration. Therefore, in all 100 examinations with different bus loads, all trials of bus-off attack succeeded regardless of the bus condition.

In order to mount the bus-off attack, the injected message has to satisfy conditions C1-C3: ID, timing, and contents. Among these, C2 is the most difficult to meet, but can be satisfied by exploiting either of the following three scenarios: (1) periodicity-measure the transmission interval of the target message and exploit it for synchronizing the timing; (2) genuine ID-assuming genuine preceded IDs are available, exploit them for bus-off attack; and (3) fabricated ID-fabricating the preceded ID of a target message and thus exploiting it. All of these scenarios are evaluated in order to verify their accuracies and efficiencies. For the first scenario, the adversary and the victim were programmed to send messages every 10 ms with the same ID but different DLC values. The first transmissions from both nodes were initiated by a reference message sent by the non-victim node. For the second scenario of exploiting genuine preceded IDs, the nodes were programmed equivalently. Finally, for the third scenario, the adversary was programmed to fabricate one preceded ID message per attack as shown in FIG. 7. Table I shows the success probability of 50,000 bus-off attack trials in these three scenarios. Here, a success refers to when the victim's TEC was increased by 8 from the attack.

TABLE 1

COMPARISON Between A Bus-Off Attack Exploiting Periodicity Or Genuine/Fabricated Preceded ID of Messages.

|  | Periodicity | Genuine ID | Fabricated ID |
|---|---|---|---|
| #Success/#Trials | 58/50,000 | 50,000/50,000 | 45,127/50,000 |
| Success Probability | 0.12% | 100% | 90.25% |

Figure 16:
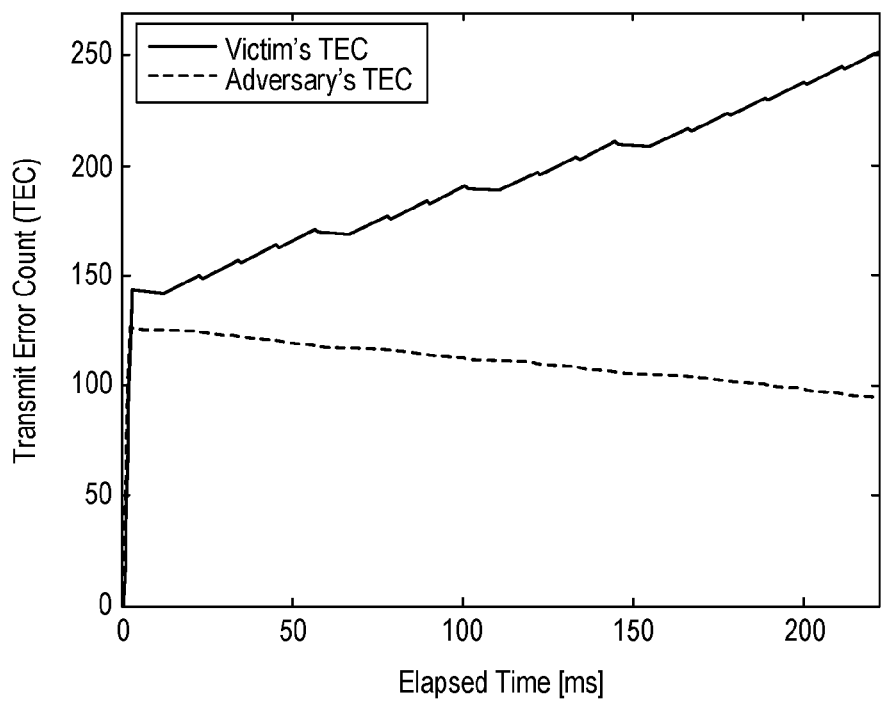
FIG. 16 is a graph showing the change in TECs when the adversary fabricates the preceded IDs.
Figure 17:
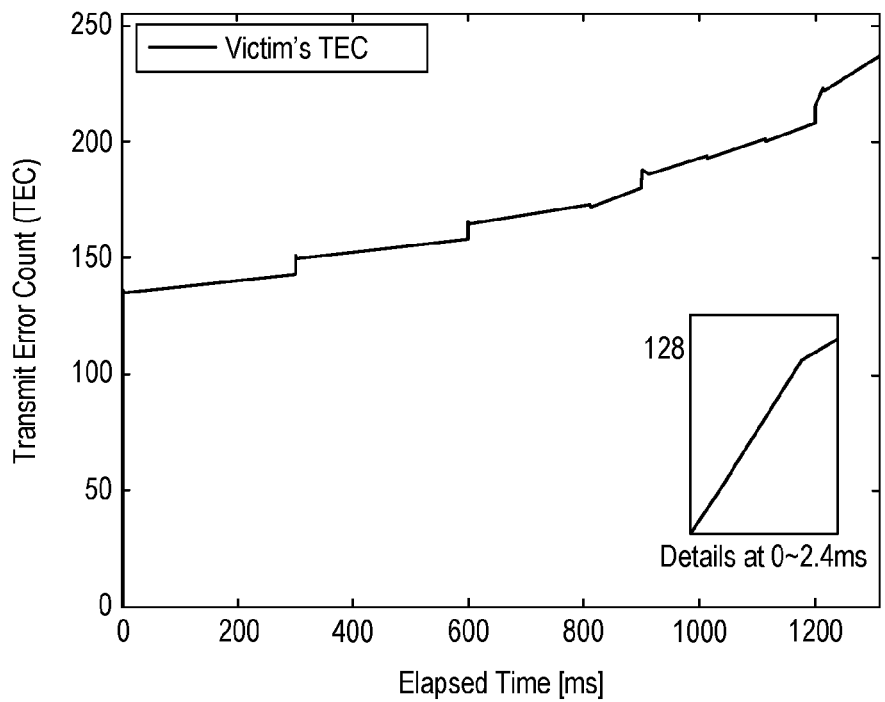
FIG. 17 is a graph showing a change in victim's TEC during an iterative bus-off attack on a real vehicle.

When periodicity was exploited to synchronize the Tx timing for a bus-off attack, due to incurred jitters, only 0.12% of the trials were able to trigger a bit error at the victim, and thus the victim eventually did not bus off. On the other hand, when genuine preceded IDs were assumed to be present and thus were exploited, all 50,000 trials succeeded in increasing the victim's TEC. Even without assuming that there is a genuine preceded ID for the target message, its fabrication also allowed the adversary to cause an increase of the victim's TEC with a high probability of 90.25%. Note that in achieving such a high probability, one fabricated preceded ID was sufficient since the measured jitter deviation $\sigma_v$=0.023 ms. Although some attempts failed, due to the high success rate and the nature of change in TEC (i.e., +8 in TEC in case of error and −1 in the absence of error), iterative bus-off attacks eventually forced the victim to enter bus-off mode as shown in FIG. 16. One can see that the change in TEC is slightly different from the one in FIG. 13 due to some failed attempts. These results show that a preceded ID, regardless of whether genuine or fabricated, is a good indicator for determining the exact timing of a specific message, and indeed is useful for mounting a bus-off attack.

To further evaluate the practicability of bus-off attack, experiments were also conducted on a real vehicle. The vehicle used for the experiments was a 2013 Honda Accord, which was immobilized in an isolated and controlled environment for safety. Through the On-Board Diagnostic (OBD-II) system port, which was located under the dashboard, the CAN bus prototype is connected to the in-vehicle CAN network running at 500 Kbps. From a laptop and through the three CAN prototype nodes, all 40 distinct broadcast messages from the in-vehicle CAN bus as well as inject arbitrary messages were received and read. Since the CAN-H and CAN-L voltage levels were shared among the prototype nodes via a breadboard as well as with the in-vehicle CAN bus through an OBD-II connection, all three nodes were able to communicate with the in-vehicle ECUs.

While observing the in-vehicle network, it was found that all CAN messages implemented by the Honda Accord contained a (non-cryptographic) 1-byte message checksum in the last byte of the data, i.e., an additional layer of protection to the CAN CRC. Hence, without knowing and thus using the implemented checksum algorithms (e.g., XOR checksum), injected messages were not delivered to the intended ECUs due to incorrect checksums. However, some CAN messages as well as the implemented checksum algorithms were reverse engineered. The details of the reverse-engineered IDs and the checksum algorithms are omitted since they are proprietary information to the vehicle manufacturer. Through such processes, false alarms were raised on the dashboard (e.g., false tire pressure warning lamp) by injecting messages from our CAN prototype nodes. Note that reverse-engineering was done to verify the intercommunication between prototype nodes and in-vehicle ECUs, not to fulfill any requirements for mounting the attack.

This communication capability shows that the three CAN prototype nodes were successfully added to the in-vehicle CAN network, and hence operate just like any other real in-vehicle ECUs. As a result, an attack on one of them would be equivalent to an attack on a real in-vehicle ECU. To validate the increase in victim's TEC during a bus-off attack on a real vehicle while ensuring safety, one of these CAN nodes was chosen as the victim. Unlike the prototype setting, however, the bus load was significantly high—due to the bus traffic generated by real in-vehicle ECUs during the attack on the victim, i.e., the attack was evaluated in a highly complex CAN bus traffic. In order not to increase the bus load too much and thus prevent unpredictable malfunctions of the vehicle under test, the periodicity of the target message was set to 50 ms.

FIG. 11 shows the change in TEC of the victim node being attacked on an in-vehicle network. Through iterative bus-off attacks, the victim became error-passive within 2.4 ms and eventually entered bus-off mode within 1.3 secs. Compared to the prototype setting, since the target message was set to have a larger interval and the bus load was much higher, the overall delays of the victim entering error-passive and bus-off were larger. These evaluation results on a real vehicle confirm that the bus-off is indeed a severe, real-world problem.

The bus-off attack is an important vulnerability which must be addressed, especially in view of its capability of evading state-of-the-art defense mechanisms. It nullifies the use of checksums and MACs, and also makes it difficult for an IDS to distinguish an attack from a system fault/error. Thus, a new defense mechanism is presented which can prevent and detect the bus-off attack. This mechanism leverages the following features/symptoms of the bus-off attack.

In Phase 1, due to automatic retransmissions by the CAN controller,
F1. at least two consecutive errors occur when transmitting the frames. So, consecutive error frames with an active error flag are watched for on the bus.

In Phase 2, due to the difference in error modes,
F2. the victim suffers a bit error during its initial transmission, i.e., fails to deliver the message to the intended ECUs, but succeeds in its subsequent retransmission.

Simulations are performed to determine the probability of feature F1 occurring under an uncompromised condition, i.e., bit errors occur due to only system errors/faults, not by any attack. The same error model discussed above is leveraged for the simulations, i.e., where bit error occurrences follow a Bernoulli distribution, and the error occurrences in each bit position are independent. In the simulation, for a given DLC value and Bit Error Rate (BER), generated 100,000 different CAN messages are randomly generated and assessed to determine how many of them satisfy F1. The simulation result, show that even under an unusually high BER of $10^{-3}$ (BER is usually $10^{-5}$~$10^{-7}$), the maximum probability of F1 was only 0.11%. Consequently, the probability of F1 occurring 16 times in a bursty manner can be considered zero; whereas it was 1 during a bus-off attack.

Figure 18:
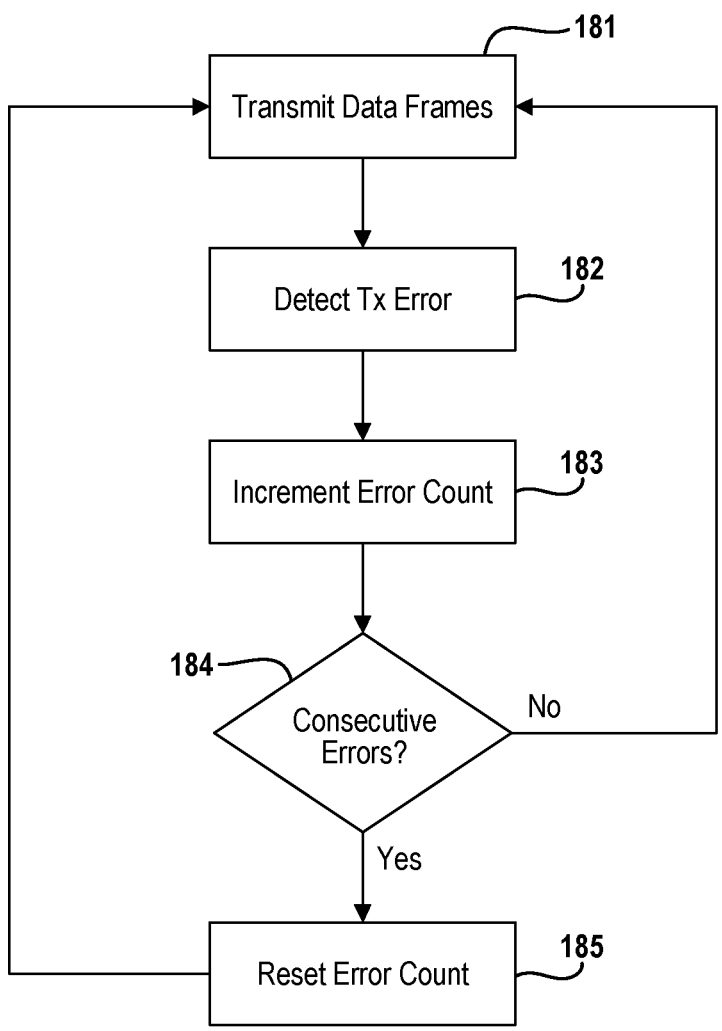
FIG. 18 is a flowchart depicting a method for countering a bus-off attack.

Considering this discrepancy, a computer-implemented method is presented for countering a bus-off attack on an electronic control unit in a vehicle network. Referring to FIG. 18, two or more data frames are transmitted at 181 by a given electronic control unit over a vehicle network, where the electronic control unit is connected to the vehicle bus and resides in a vehicle. Upon detecting an error in a transmission made by the electronic control unit at 182, a transmit error counter is incremented by a fixed increment at 183 by the electronic control unit. Thus, the incrementing occurs in response to detecting a transmission error. The transmit error counter tracks transmission errors in a manner prescribed by CAN and other vehicle network protocols.

The electronic control unit is further configured to detect consecutive transmission errors occurring at the electronic control unit as indicated at 184. Whenever N consecutive and bursty error frames are observed after an attempt of transmitting a message on the CAN bus, the transmit error counter is reset to a lower value (e.g., zero) as indicated at 185, where N is a design parameters. It is to be understood that only the relevant steps of the methodology are discussed in relation to FIG. 18, but that other software-implemented instructions may be needed to control and manage the overall operation of the system.

Configuring the proposed countermeasure with a low N value can minimize the occurrence of bit errors at the victim ECU, keep it in error-active mode, and thus prevent the bus-off attack. However, if N is set too low, i.e., always keeping the victim in error-active mode, then it also prevents the victim from delivering its message to the intended ECUs during the attack. Note that, as illustrated in FIG. 5, any transmission attempts by the victim fail during Phase 1 of the attack, and can only succeed after the victim enters error-passive mode, i.e., Phase 2 of the attack. Accordingly, N is preferably set to a value which prevents the victim's bus-off as well as lets the victim succeed in delivering its message to the intended ECUs. In one embodiment, N is set to 16 so that the victim ECU is reset as soon as it enters error-passive mode, which is when the victim first succeeds in its transmission.

Figure 19:
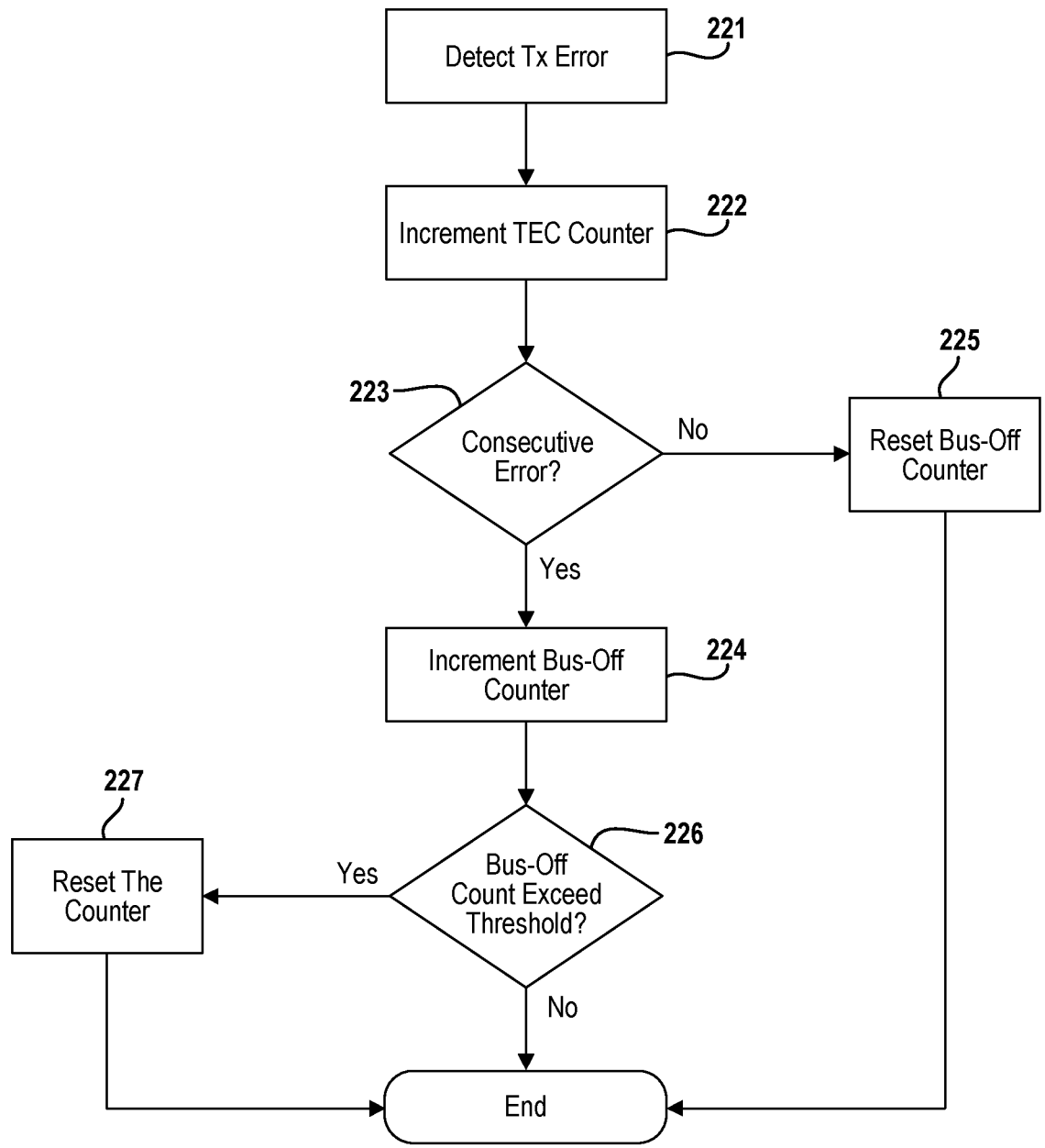
FIG. 19 is a flowchart depicting an example embodiment of a method for countering a bus-off attack.

FIG. 19 depicts an example embodiment for countering an attack to place an electronic control unit of a controller area network (CAN) into a safe mode. This method begins by detecting an error in transmission of a data frame at 221 by the electronic control unit. In response to detecting a transmission error of the data frame, a transmit error counter is incremented by a fixed increment (e.g., 8) at 222, where the transmit error counter tracks transmission errors of the electronic control unit.

Next, a determination is made at 223 as to whether the transmission error was preceded immediately by another error in transmission of the data frame by the electronic control unit. If the transmission was preceded immediately by another transmission error of the data frame, then the bus-off counter is incremented by one at 224, where the bus-off counter tracks consecutive transmission errors of the electronic control unit. If the transmission was not preceded immediately by another transmission error, then the bus-off counter is reset to zero at 225.

After incrementing the bus-off counter, another determination is made at 226 as to whether the bus-off counter exceeds a threshold (e.g., two). If the bus-off counter exceeds the threshold, then a preventive countermeasure is taken. In one embodiment, the transmit error counter is reset at 227 to zero. In other embodiments, the electronic control unit itself is simply reset. Other types of countermeasures are also contemplated by this disclosure. The method is preferably implemented as processor executable instructions by one or more of the ECUs residing in the vehicle network. It is to be understood that only the relevant steps of the methodology are discussed in relation to FIG. 19, but that other software-implemented instructions may be needed to control and manage the overall operation of an ECU.

Figure 20:
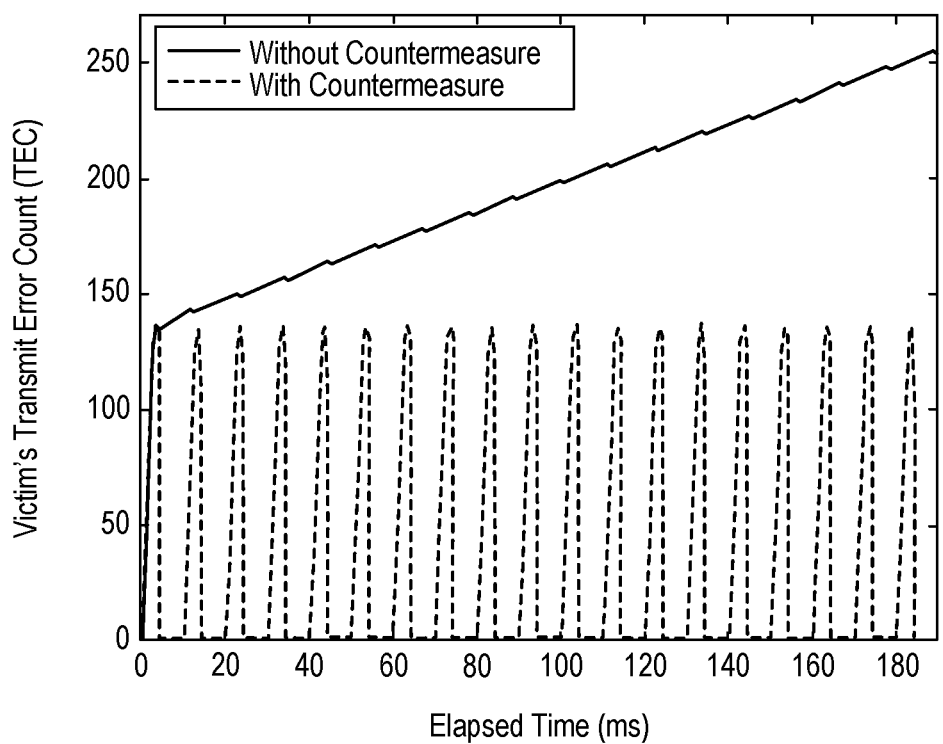
FIG. 20 is a graph showing the efficiency of the proposed countermeasure against a bus-off attack.

The bus-off attack was evaluated on a CAN bus prototype with the proposed countermeasure implemented. According to the proposed defense, the nodes were programmed to reset when 16 consecutive and bursty error frames were observed after transmitting a message on the CAN bus. FIG. 20 shows how the victim's TEC changed with and without the proposed defense during an iterative bus-off attack. By observing the presence of bursty error frames on the CAN bus, the victim's error mode mostly stayed as error-active, which is in contrast to the case without any countermeasure, and also successfully transmitted its messages, efficiently preventing the bus-off attack.

An adversary can harm the in-vehicle network through not only a bus-off attack but also other means. For example, the attacker can simply inject a series of arbitrary attack messages on the CAN bus, or jam/interrupt the network. Such types of attack may be easier for the attacker to mount and also be more harmful to the in-vehicle network. However, such attacks significantly increase the message frequency and hence can easily be detected and then removed via existing IDSs. In contrast, the proposed bus-off attack requires only a small increase in message frequency—up to a frequency where it is also feasible during system error—and thus the existing IDSs would get confused about whether the symptom is due to an attack or system error, i.e., the bus-off attack can be stealthy. This is the rationale behind not injecting a series of numerous preceded ID messages or attack messages when mounting the bus-off attack.

Although most modern in-vehicle networks are based on the CAN protocol, some may deploy other protocols, such as CAN-FD, TTCAN and FlexRay, for more complex operations.

CAN-FD is an enhanced version of CAN, providing flexible and higher data rates as well as a larger data field. Although newly introduced fields (e.g., Error State Indicator (ESI)) are included in the CAN-FD message format, its basic components and arbitration & error handling conform to those in CAN. Hence, CAN-FD is also vulnerable to the proposed bus-off attack. What makes CAN-FD more interesting is that an attacker can monitor the newly introduced Extended Data Length (EDL) and Bit Rate Switch (BRS) fields, recognize which messages are sent with high bit rates or large payloads (i.e., safety-critical ones), and target them for a bus-off attack. In other words, the newly-introduced features of CAN-FD aid the attacker to disconnect safety-critical ECUs. Similarly, as discussed before, the features of TTCAN also help the attacker succeed in mounting a bus-off attack.

In FlexRay, which is designed to be more reliable than CAN as in CAN-FD, the error modes are divided into three different modes: normal-active, normal-passive, and halt. Normal-active mode is essentially equivalent to the error-active mode of CAN, whereas normal-passive mode differs from the CAN's error-passive mode, as it does not allow the nodes to transmit in that mode. Thus, FlexRay becomes invulnerable to the proposed bus-off attack. Note, however, that the high implementation cost of FlexRay as well as the merit of CAN-FD having minimal upgrade and migration costs make CAN-FD preferable to FlexRay as the next-generation in-vehicle network. Therefore, the proposed bus-off attack is a critical vulnerability for vehicles and must thus be addressed.

Although various types of communication on vehicles have provided drivers/passengers convenience and safety, they have also created vulnerabilities, thus making remote attacks feasible. Even though state-of-the-art vehicle security solutions can handle some of the vulnerabilities, they cannot cover all critical ones. In this disclosure, we discovered an important new vulnerability, called the bus-off attack, of in-vehicle networks, including CAN, TTCAN, and CAN-FD. The attack exploits the safe mode of CAN to disconnect an uncompromised/healthy ECU and/or even shut down the entire in-vehicle network.

Even though the proposed attack has not yet been seen in the wild, it is easy to mount and also directly related to driver/passenger safety, and should thus be countered with high priority. Moreover, the fact that the proposed attack cannot be prevented or detected by any state-of-the-art solutions makes it even more important to design and deploy its countermeasures. Thus, concerted efforts from both academia and industry are recommended to account for this vulnerability in the design of in-vehicle networks. The proposed countermeasure is an important first step in this direction.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

Further areas of applicability will become apparent from the description provided herein. The description and specific examples in this summary are intended for purposes of illustration only and are not intended to limit the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for countering an attack on an electronic control unit in a vehicle network, comprising:
    transmitting, by an electronic control unit, two or more data frames over a vehicle network, where the electronic control unit is connected to the vehicle bus and resides in a vehicle;
    detecting, by an electronic control unit, an error in a transmission made over the vehicle network by the electronic control unit;
    determining, by the electronic control unit, whether the transmission error was preceded immediately by another error in transmission of the data frame by the electronic control unit;
    incrementing, by the electronic control unit, a bus-off counter in response to a determination that the transmission was preceded immediately by another transmission error of the data frame, where the bus-off counter tracks consecutive transmission errors of the electronic control unit;
    determining, by the electronic control unit, whether value of the bus-off counter exceeds a threshold; and
    resetting the electronic control unit itself in response to a determination that the value of the bus-off counter exceeds the threshold.

2. The method of claim 1 further comprises
    incrementing, by the electronic control unit, a transmit error counter by a fixed increment, where the incrementing occurs in response to detecting a transmission error and the transmit error counter tracks transmission errors by the electronic control unit;
    detecting, by the electronic control unit, two or more consecutive transmission errors by the electronic control unit, where the detecting two or more consecutive transmission errors is in response to incrementing a transmit error counter.

3. The method of claim 2 further comprises
    detecting, by the electronic control unit, an error free transmission of the data frame by the electronic control unit; and
    decrementing, by the electronic control unit, the transmit error counter by a fixed decrement in response to detecting an error free transmission of the data frame.

4. The method of claim 3 further comprises resetting, by the electronic control unit, value of the bus-off counter to zero in response to a determination that the transmission was not preceded immediately by another transmission error of the data frame.

5. The method of claim 4 further comprises transmitting, by the electronic control unit, an active error flag in response to detecting a transmission error of the data frame, wherein the active error flag is a data frame having consecutive dominant bits.

6. The method of claim 5 further comprises transmitting the two or more data frames over the vehicle network in accordance with controller area network protocol.

7. The method of claim 6 further comprises resetting the transmit error counter to zero.

8. The method of claim 1 further comprises transmitting two or more data frame in accordance with controller area network protocol or FlexRay communication protocol.

9. A method for countering an attack to shut down an electronic control unit of a controller area network (CAN), comprising:
    detecting, by an electronic control unit, an error in transmission of a data frame by the electronic control unit;
    incrementing, by the electronic control unit, a transmit error counter by a fixed increment in response to detecting a transmission error of the data frame, where the transmit error counter tracks transmission errors of the electronic control unit;
    determining, by the electronic control unit, whether the transmission error was preceded immediately by another error in transmission of the data frame by the electronic control unit;
    incrementing, by the electronic control unit, a bus-off counter in response to a determination that the transmission was preceded immediately by another transmission error of the data frame, where the bus-off counter tracks consecutive transmission errors of the electronic control unit;
    determining, by the electronic control unit, whether value of the bus-off counter exceeds a threshold; and
    implementing a preventive countermeasure by the electronic control unit in response to a determination that the value of the bus-off counter exceeds the threshold.

10. The method of claim 9 wherein implementing a preventive countermeasure further comprises resetting the electronic control unit itself in response to a determination that the value of the bus-off counter exceeds the threshold.

11. The method of claim 9 wherein implementing a preventive countermeasure further comprises resetting the transmit error counter to zero in response to a determination that the value of the bus-off counter exceeds the threshold.

12. The method of claim 9 further comprises
    detecting, by the electronic control unit, an error free transmission of the data frame by the electronic control unit; and decrementing, by the electronic control unit, the transmit error counter by a fixed decrement in response to detecting an error free transmission of the data frame.

13. The method of claim 9 further comprises resetting, by the electronic control unit, value of the bus-off counter to zero in response to a determination that the transmission was not preceded immediately by another transmission error of the data frame.

14. The method of claim 9 further comprises transmitting, by the electronic control unit, an active error flag in response to detecting a transmission error of the data frame, wherein the active error flag is a data frame having six consecutive dominant bits in accordance with a controller area network protocol.

15. The method of claim 9 wherein the fixed increment is eight and the fixed decrement is one.

16. The method of claim 9 wherein the value of the threshold is sixteen.

* * * * *